(12) United States Patent
McMahan

(10) Patent No.: US 9,452,597 B2
(45) Date of Patent: Sep. 27, 2016

(54) METHOD FOR FABRICATING AN ANTI-FATIGUE MAT WITH A PRE-FORMED GEL CUSHIONING MEMBER

(75) Inventor: Robert L. McMahan, Cedar Park, TX (US)

(73) Assignee: LET'S GEL, INC., Austin, TX (US)

( * ) Notice: Subject to any disclaimer, the term of this patent is extended or adjusted under 35 U.S.C. 154(b) by 1044 days.

(21) Appl. No.: 12/754,536

(22) Filed: Apr. 5, 2010

(65) Prior Publication Data
US 2011/0240212 A1    Oct. 6, 2011

(51) Int. Cl.
*B32B 37/06*  (2006.01)
*B32B 37/04*  (2006.01)
(Continued)

(52) U.S. Cl.
CPC ............ *B32B 37/04* (2013.01); *A47G 27/0231* (2013.01); *B29C 39/003* (2013.01); *B29C 65/1432* (2013.01); *B29C 66/0342* (2013.01); *B29C 66/433* (2013.01); *B29C 66/83411* (2013.01); *B29C 63/04* (2013.01); *B29C 66/112* (2013.01); *B29C 66/131* (2013.01); *B29C 66/729* (2013.01); *B29C 66/7392* (2013.01); *B29C 66/7394* (2013.01); *B29C 66/8161* (2013.01); *B29C 66/8362* (2013.01); *B29C 66/934* (2013.01); *B29C 2793/009* (2013.01); *B29K 2105/0061* (2013.01); *B29L 2031/7324* (2013.01); *B29L 2031/751* (2013.01); *B32B 37/08* (2013.01); *B32B 38/0036* (2013.01); *B32B 2471/04* (2013.01)

(58) Field of Classification Search
CPC .................... A47G 27/0231; B29C 2793/009; B29C 39/003; B29C 63/04; B29C 64/04; B29C 65/00; B29C 65/1432; B29C 66/0342; B29C 66/112; B29C 66/131; B29C 66/433; B29C 66/729; B29C 66/8161; B29C 66/86411; B29C 66/8362; B29C 66/934; A47K 3/12; A61K 8/11; B29K 2105/0061; B29L 2031/7324; B29L 2031/751; B32B 37/04; B32B 37/08; B32B 38/0036
USPC ............................................... 156/309.9, 242
See application file for complete search history.

(56) References Cited

U.S. PATENT DOCUMENTS 3,259,925 A   7/1966   Tilles
3,634,895 A   1/1972   Childers
(Continued)

OTHER PUBLICATIONS

Premo-Promos "Cyber Gel Mouse Pad"—Premo-Promos, LLC—© 2003.
(Continued)

*Primary Examiner* — Philip Tucker
*Assistant Examiner* — Vicki Wu
(74) *Attorney, Agent, or Firm* — Mark P. Kahler

(57) ABSTRACT

A method of fabricating an anti-fatigue mat employs a pre-formed gel cushioning member that includes opposed major surfaces. One of the opposed major surfaces of the gel cushioning member is heated and liquefied. A flexible support sheet is applied and bonded to the liquefied surface of the gel cushioning member. The remaining opposed surface of the gel cushioning member is then heated and liquefied. A flexible base sheet is applied and bonded to this liquefied surface of the gel cushioning member. The method may move one of the opposed surfaces of the gel cushioning member adjacent a heat source to liquefy a portion of the gel cushioning member passing by the heat source. A flexible sheet is dispensed or applied to the liquefied portion of the gel cushioning member as the liquefied portion passes by a flexible sheet dispenser.

13 Claims, 19 Drawing Sheets

(51) Int. Cl.
*A47G 27/02* (2006.01)
*B29C 39/00* (2006.01)
*B29C 65/14* (2006.01)
*B29C 65/00* (2006.01)
B29C 63/04 (2006.01)
B29K 105/00 (2006.01)
B29L 31/00 (2006.01)
B32B 37/08 (2006.01)
B32B 38/00 (2006.01)

(56) References Cited

U.S. PATENT DOCUMENTS

| | | | |
|---|---|---|---|
| 3,996,326 A | | 12/1976 | Schachet |
| 4,010,301 A | | 3/1977 | Anderson |
| 4,119,583 A | | 10/1978 | Filip |
| 4,450,193 A | | 5/1984 | Staebler |
| 4,490,199 A | * | 12/1984 | Dunning .............. 156/73.4 |
| 4,574,101 A | | 3/1986 | Tricca |
| 4,843,666 A | | 7/1989 | Elesh |
| 4,913,755 A | | 4/1990 | Grim |
| 4,930,171 A | * | 6/1990 | Frantz .............. 5/654 |
| 5,130,187 A | | 7/1992 | Eberhardt |
| 5,176,864 A | | 1/1993 | Bates |
| 5,632,057 A | * | 5/1997 | Lyden .............. 12/146 B |
| 5,645,914 A | | 7/1997 | Horowitz |
| 5,749,111 A | * | 5/1998 | Pearce .............. 5/652 |
| 5,804,025 A | * | 9/1998 | Disselbeck et al. ....... 156/274.4 |
| 6,026,527 A | | 2/2000 | Pearce |
| 6,187,837 B1 | | 2/2001 | Pearce |
| 6,296,919 B1 | | 10/2001 | Rockwell |
| 6,314,598 B1 | | 11/2001 | Yates |
| 6,324,710 B1 | | 12/2001 | Hernandez |
| 6,325,956 B2 | | 12/2001 | Chaudhary |
| 6,371,430 B1 | | 4/2002 | Vernackt |
| 6,440,335 B1 | | 8/2002 | Kingsbury |
| 6,568,005 B2 | | 5/2003 | Fleming |
| 6,651,277 B1 | | 11/2003 | Marson |
| 6,681,416 B1 | | 1/2004 | Yang |
| 6,705,953 B2 | | 3/2004 | Haskins |
| 6,792,631 B1 | | 9/2004 | Hayden |
| 6,851,141 B2 | | 2/2005 | McMahan |
| 6,886,209 B2 | | 5/2005 | Blum |
| 6,893,600 B2 | | 5/2005 | Hughes |
| 6,933,361 B2 | * | 8/2005 | Wudl et al. .............. 528/365 |
| 6,951,035 B2 | | 10/2005 | Kinchen |
| 6,991,842 B2 | | 1/2006 | Hurwitz |
| 7,043,792 B2 | | 5/2006 | Kessler |
| 7,056,564 B2 | | 6/2006 | Sereboff |
| 7,062,807 B2 | | 6/2006 | Conforti |
| 7,076,822 B2 | | 7/2006 | Pearce |
| 7,682,680 B2 | | 3/2010 | McMahan |
| 7,754,127 B2 | | 7/2010 | McMahan |
| 8,034,274 B1 | | 10/2011 | McMahan |
| 2004/0211005 A1 | | 10/2004 | Kuo |
| 2005/0273936 A1 | | 12/2005 | Chul |
| 2006/0156581 A1 | | 7/2006 | Holden |
| 2006/0213081 A1 | | 9/2006 | Geer |
| 2006/0253988 A1 | | 11/2006 | Pearce |
| 2007/0050905 A1 | * | 3/2007 | Fowkes .............. 4/579 |
| 2008/0034614 A1 | * | 2/2008 | Fox et al. .............. 36/43 |
| 2008/0115286 A1 | * | 5/2008 | Flick et al. .............. 5/655.5 |
| 2010/0173161 A1 | * | 7/2010 | Beehag et al. .......... 428/411.1 |
| 2011/0143083 A1 | | 6/2011 | Scorgie |

OTHER PUBLICATIONS

Epinions—Revised—Fellowes gel rest & mouse pad-feels great—May 25, 2000 (updated Nov. 8, 2000).
Branders.com—Fun Mousepads © 2002.
Good Raise Chemical—Soft Mat © 1999-2004.
Lazy J Quarterhorses—Tenderfoot Stall Mats © 2002.
Technogel—"Technogel" by Technogel Italia S.R.I. © 2009.

* cited by examiner

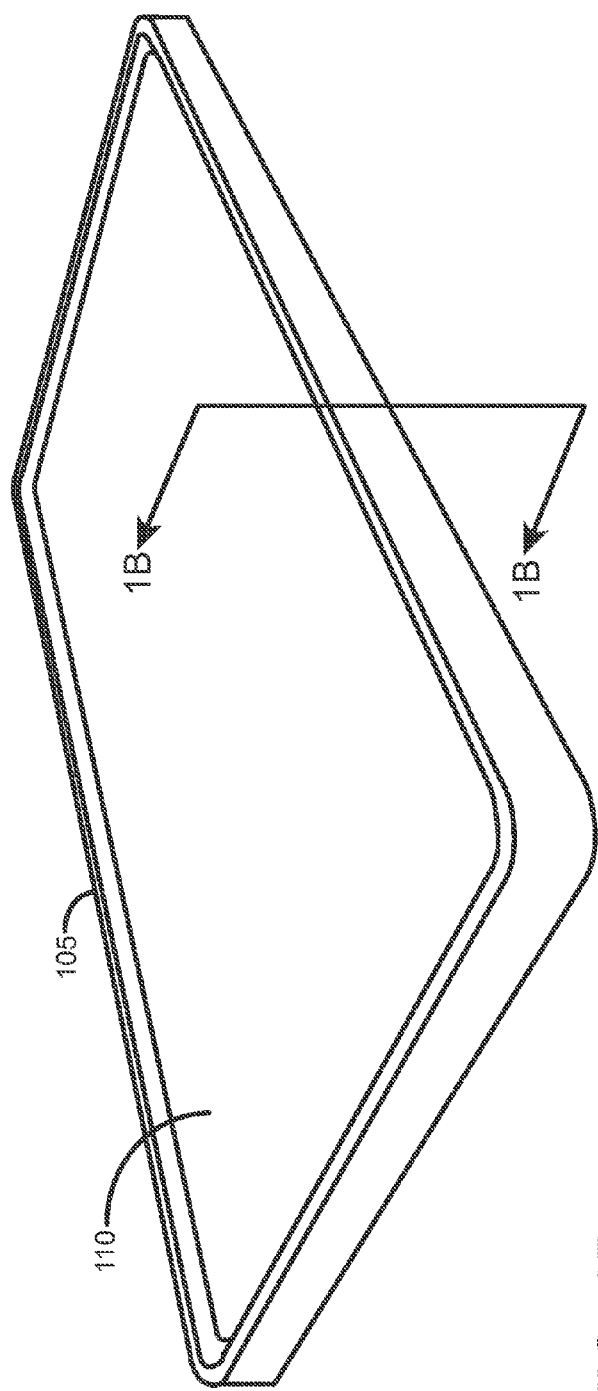
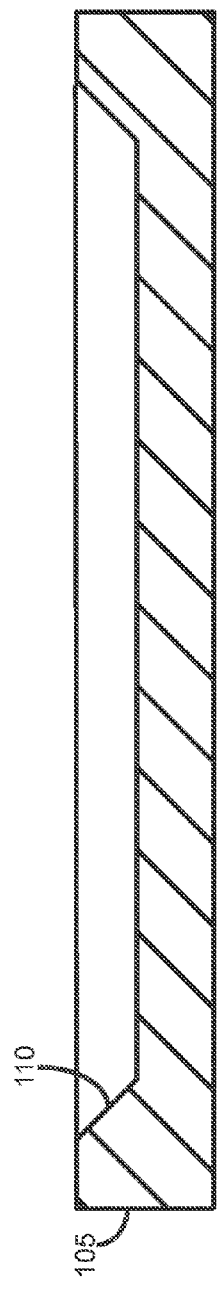
FIG. 1A
FIG. 1B

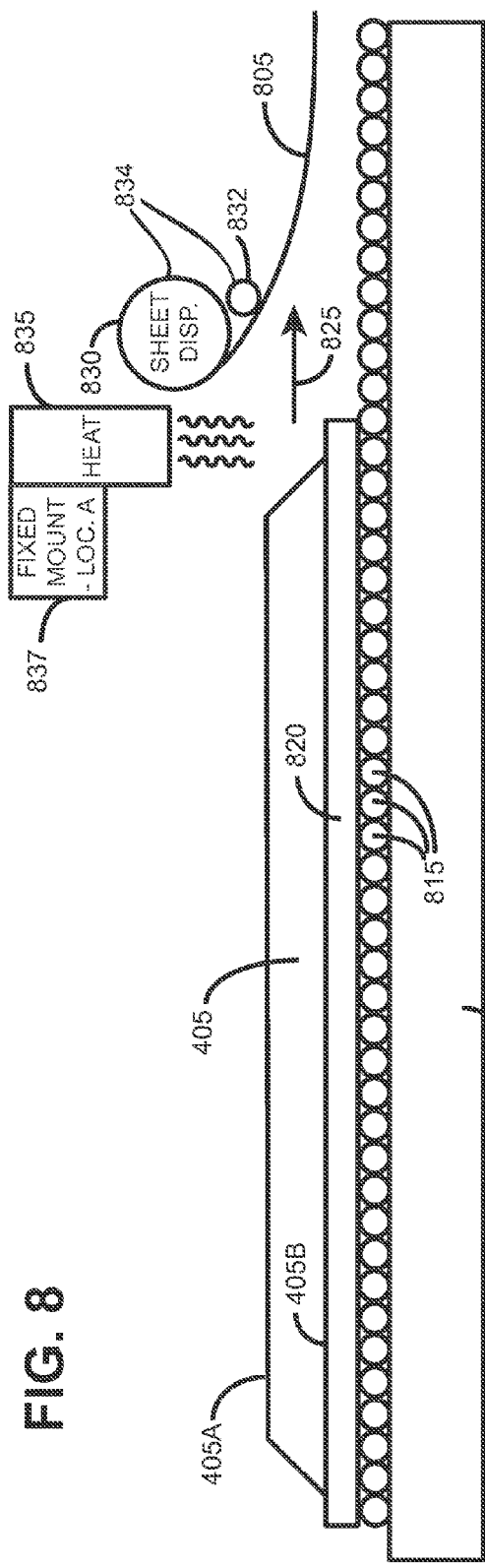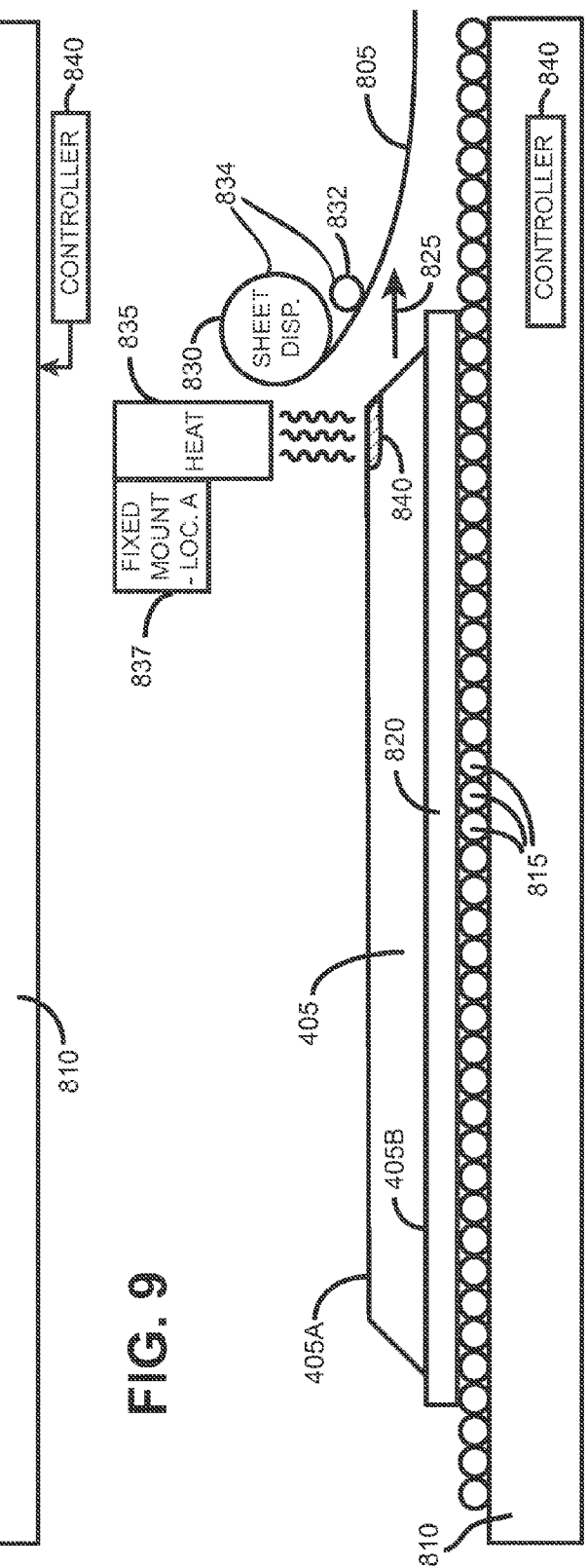

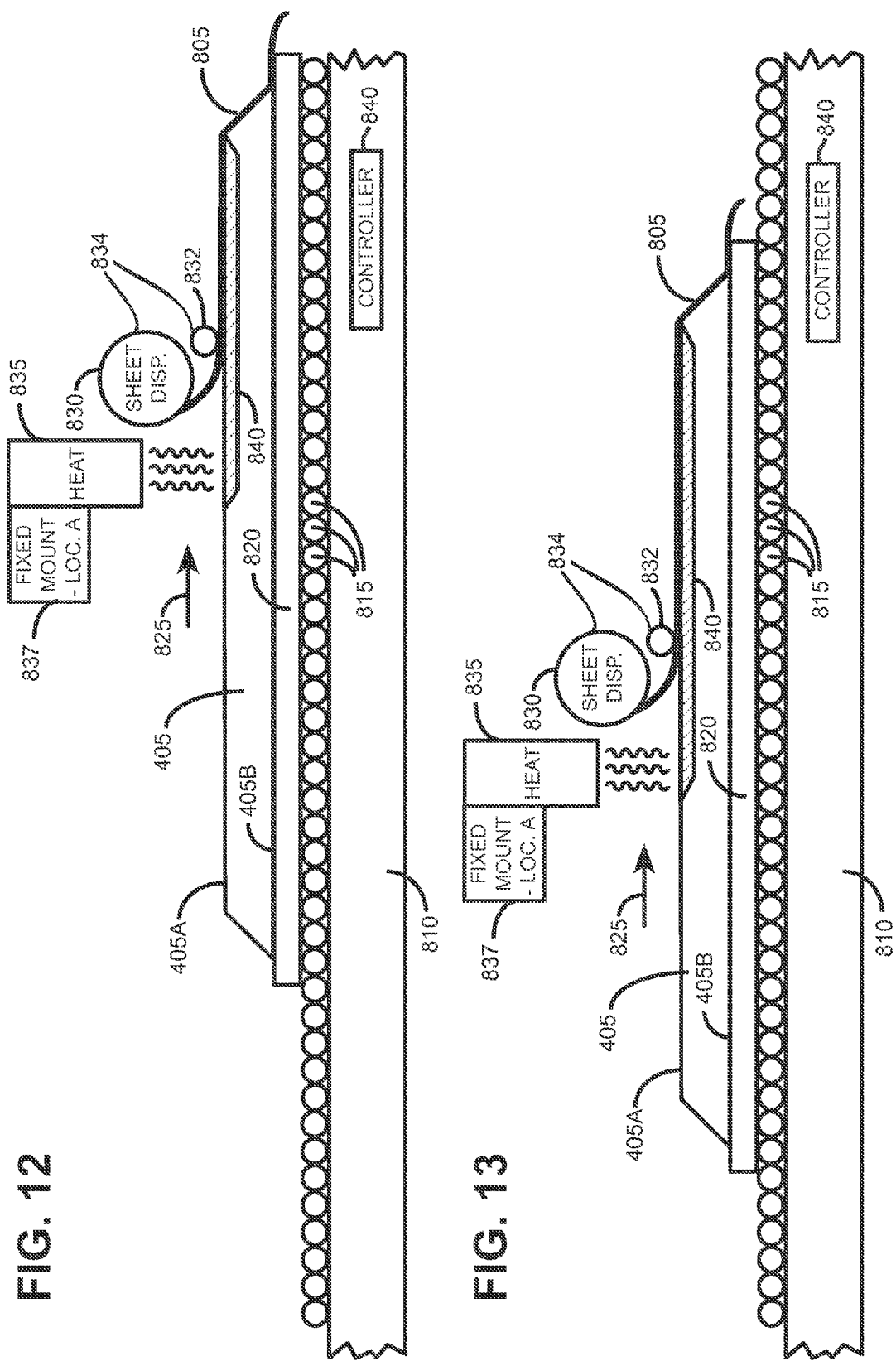

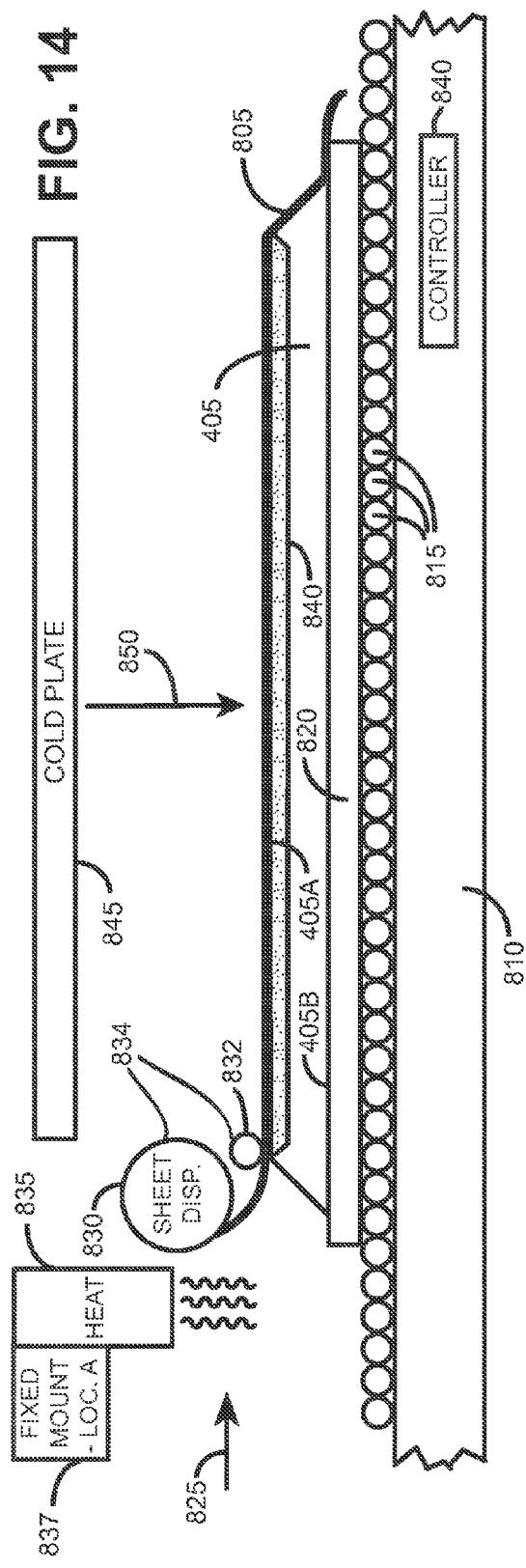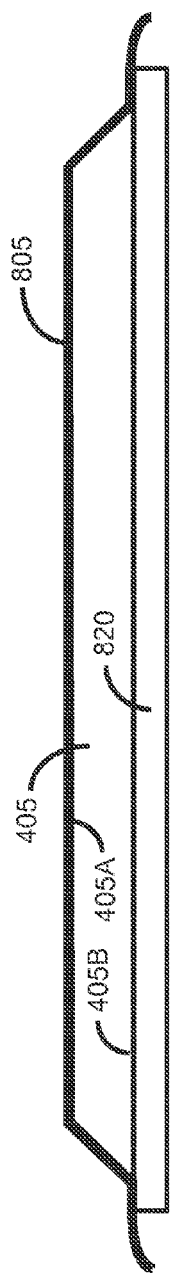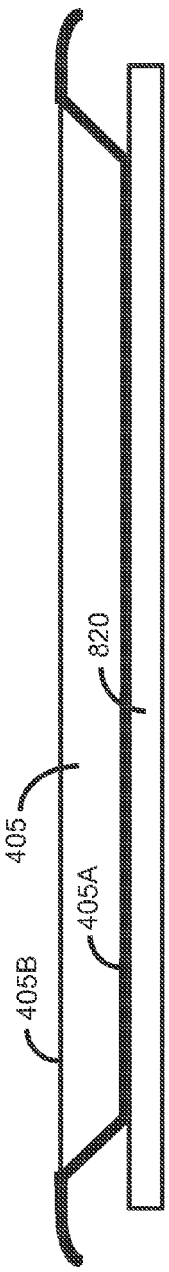
FIG. 14
FIG. 15
FIG. 16

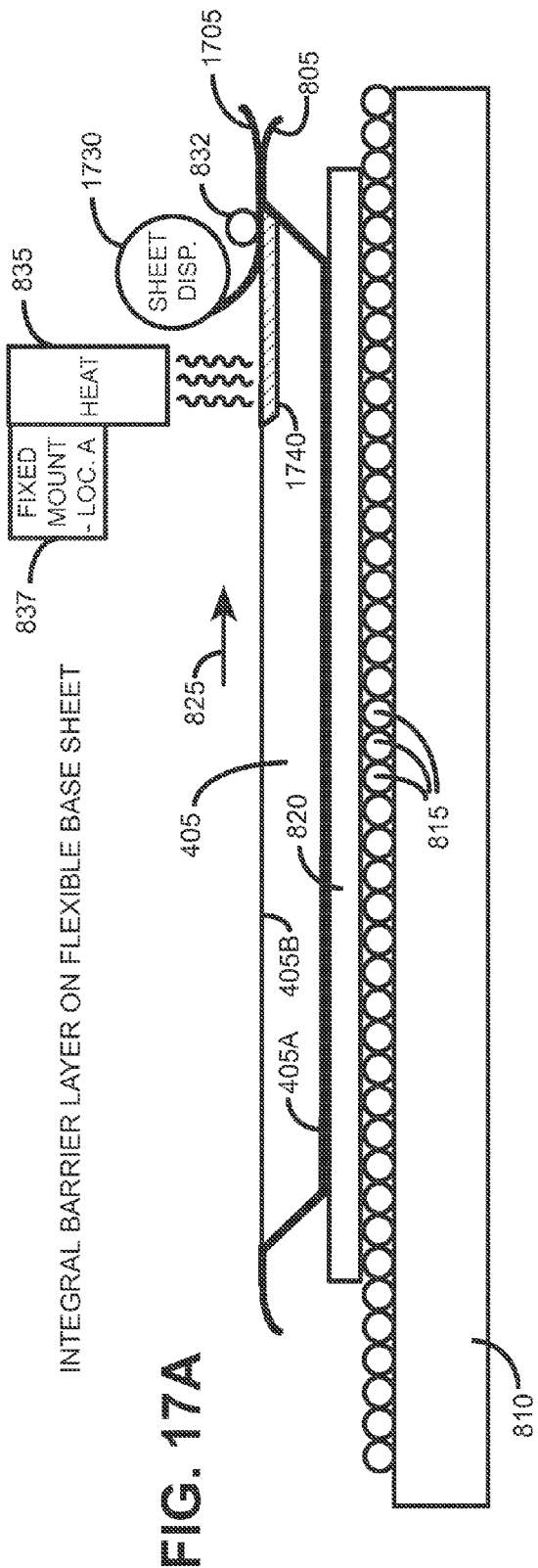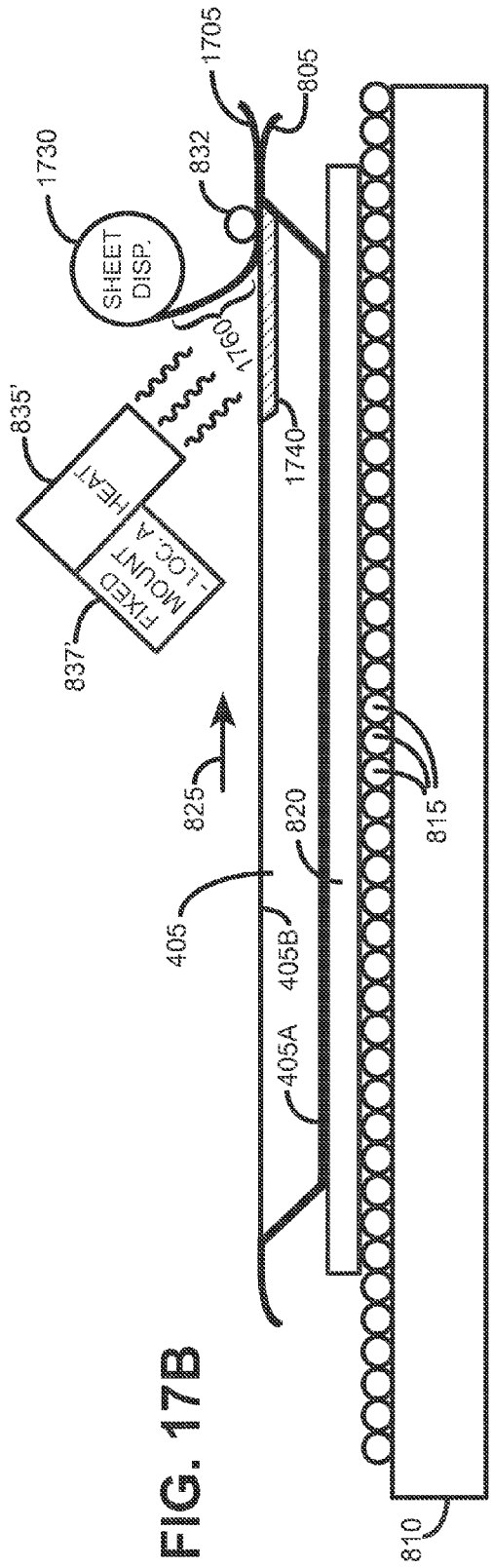

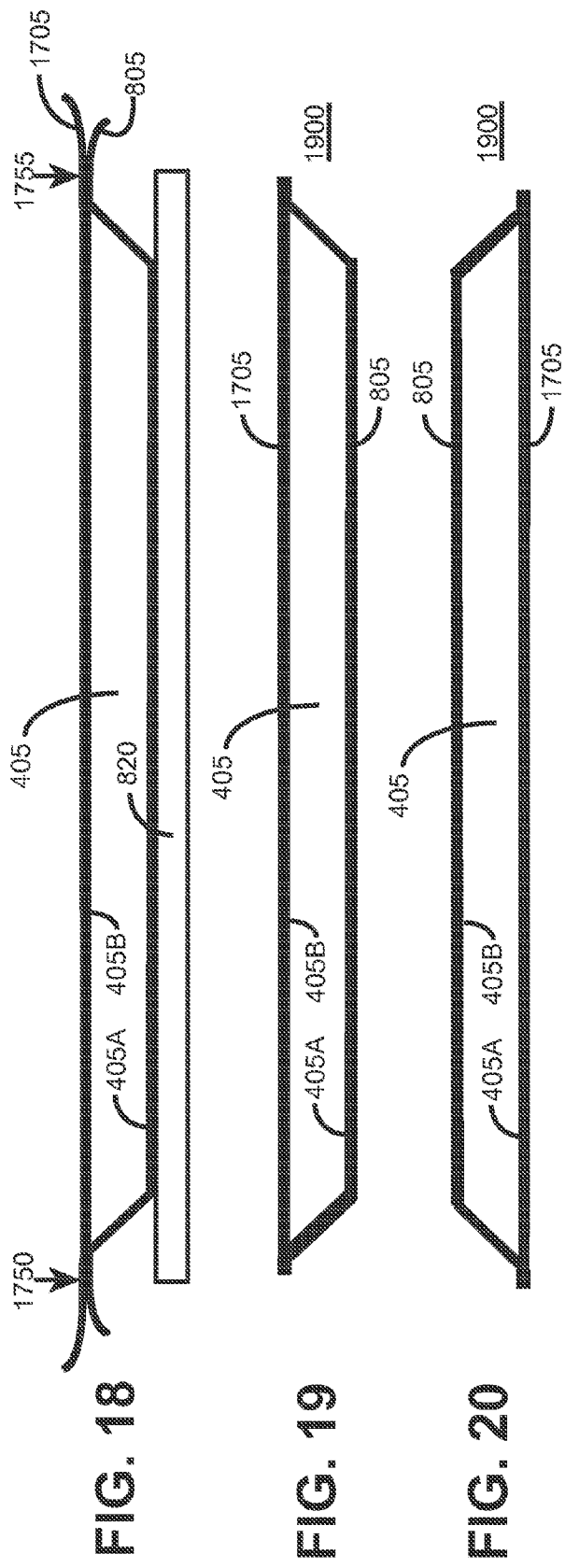

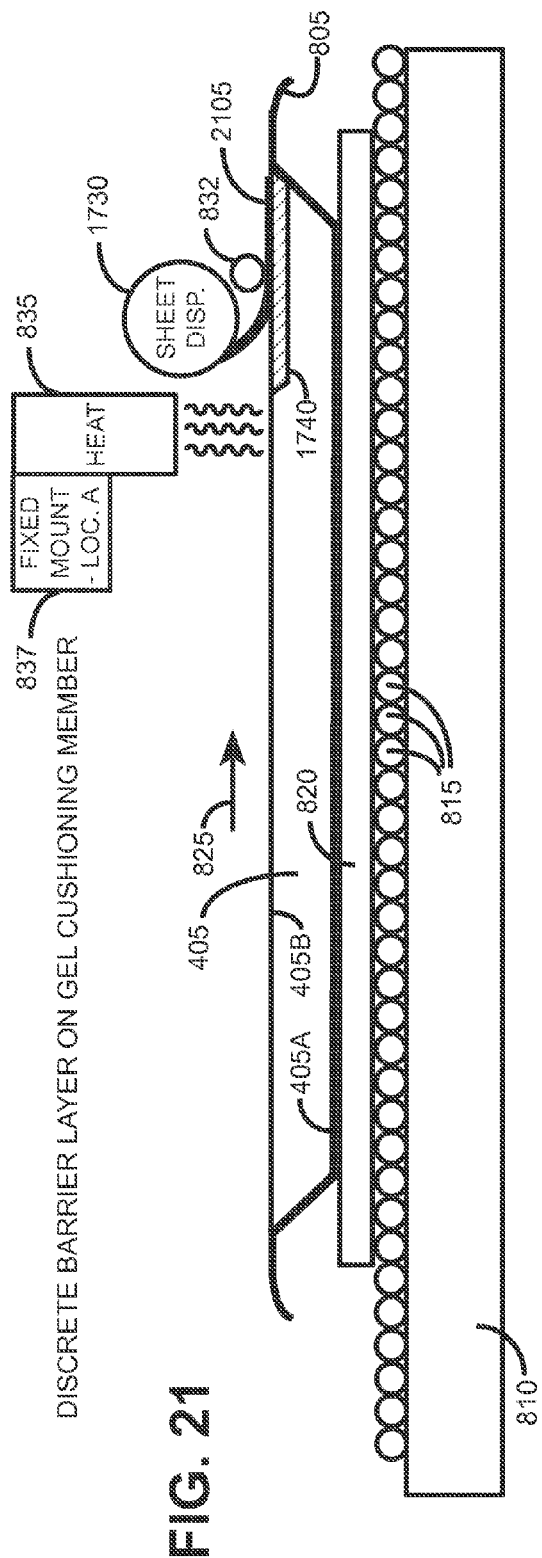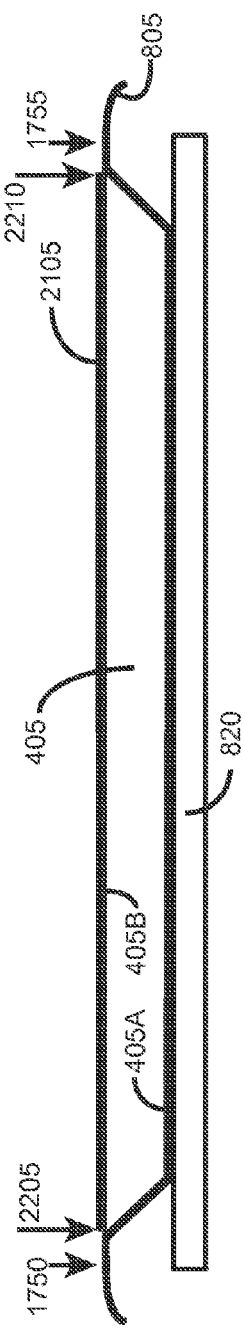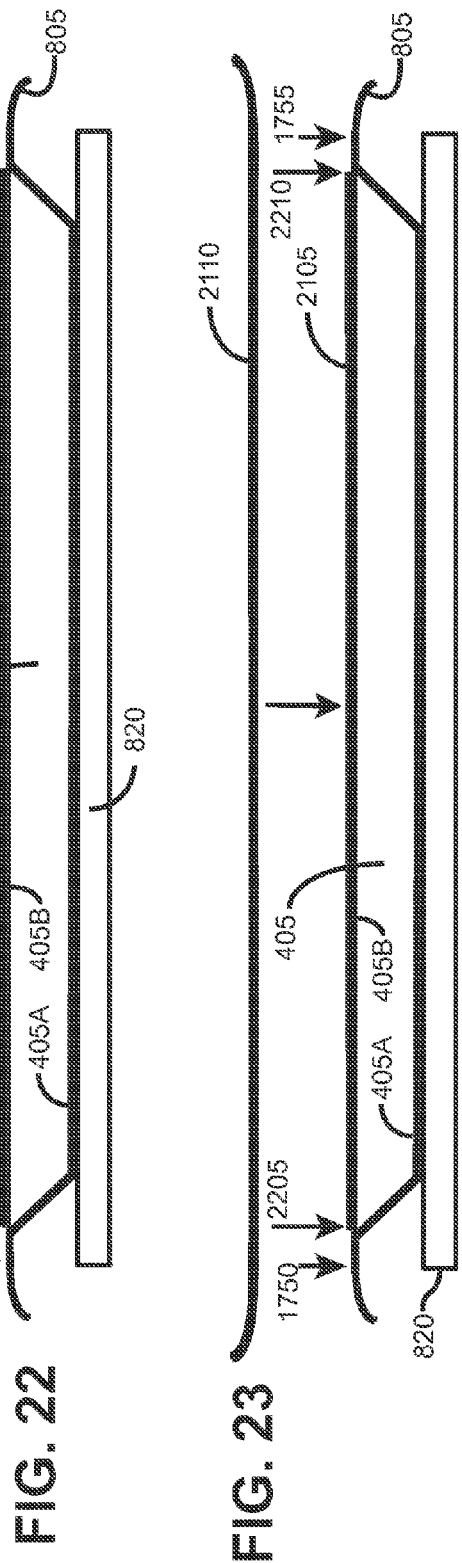

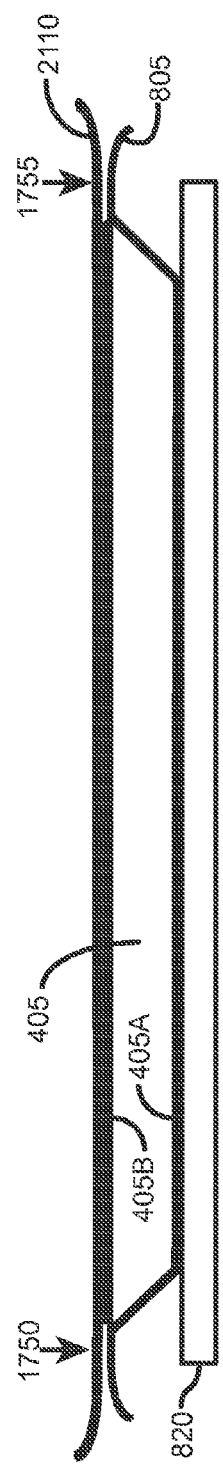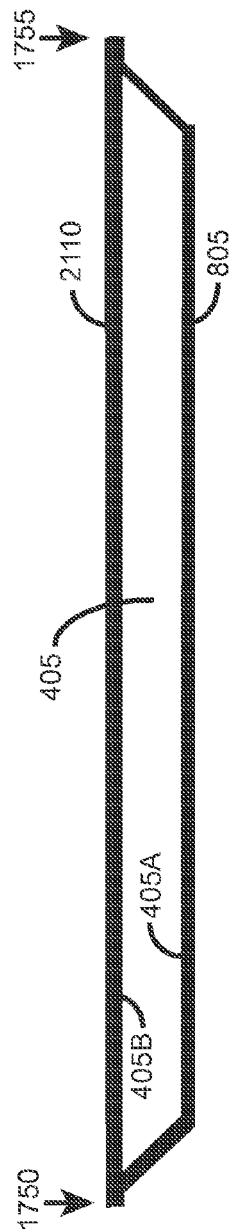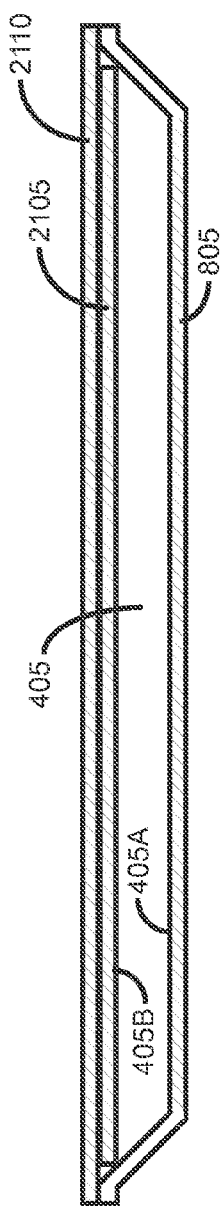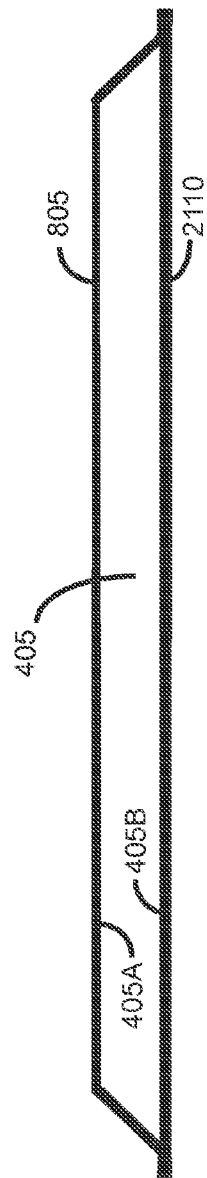

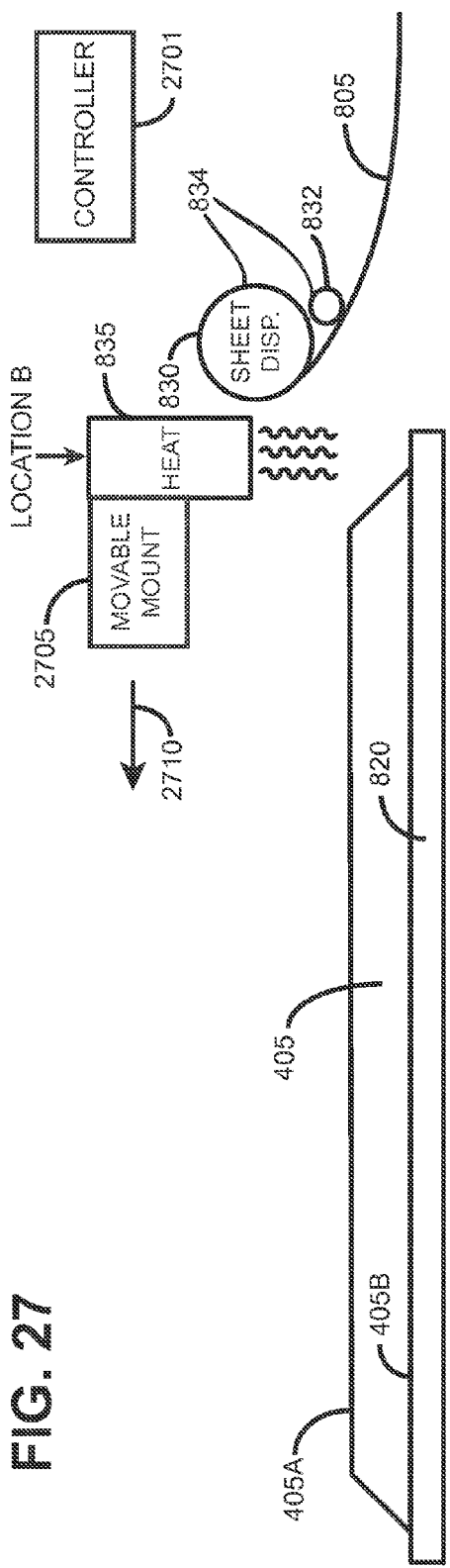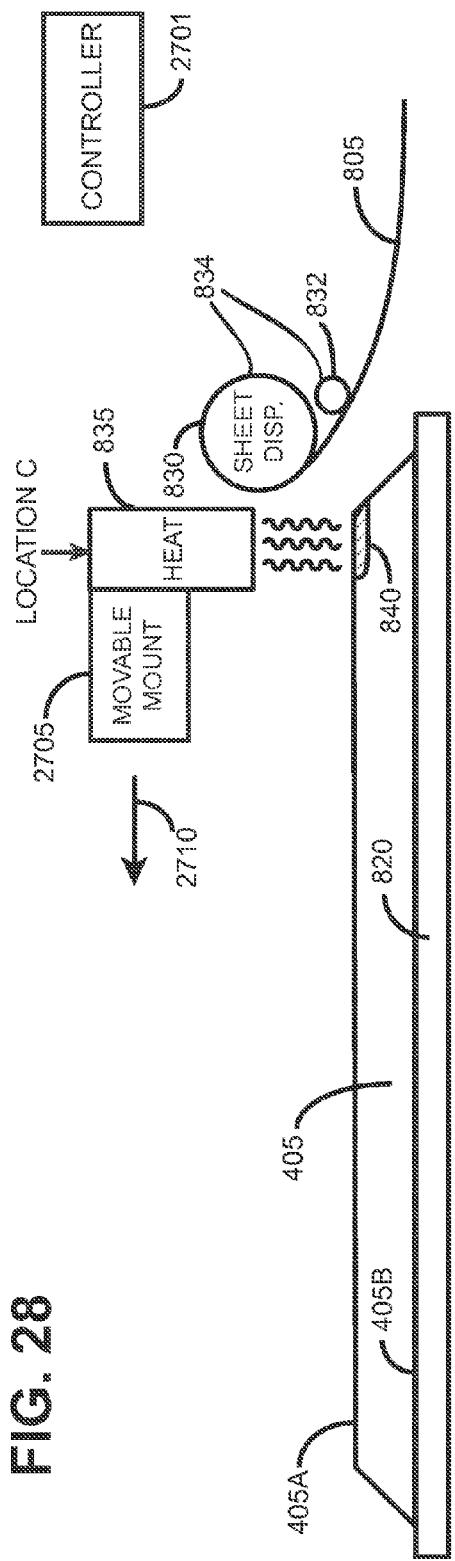

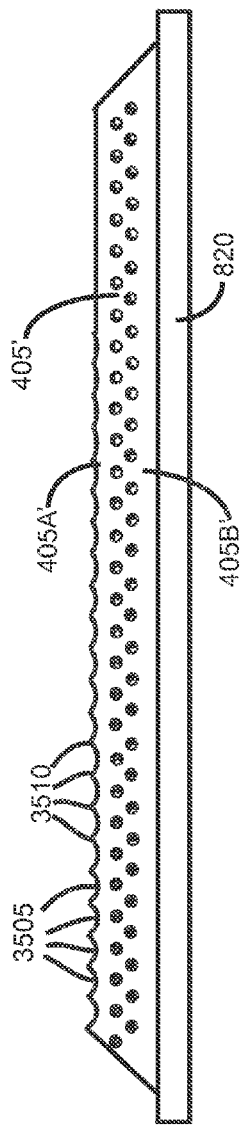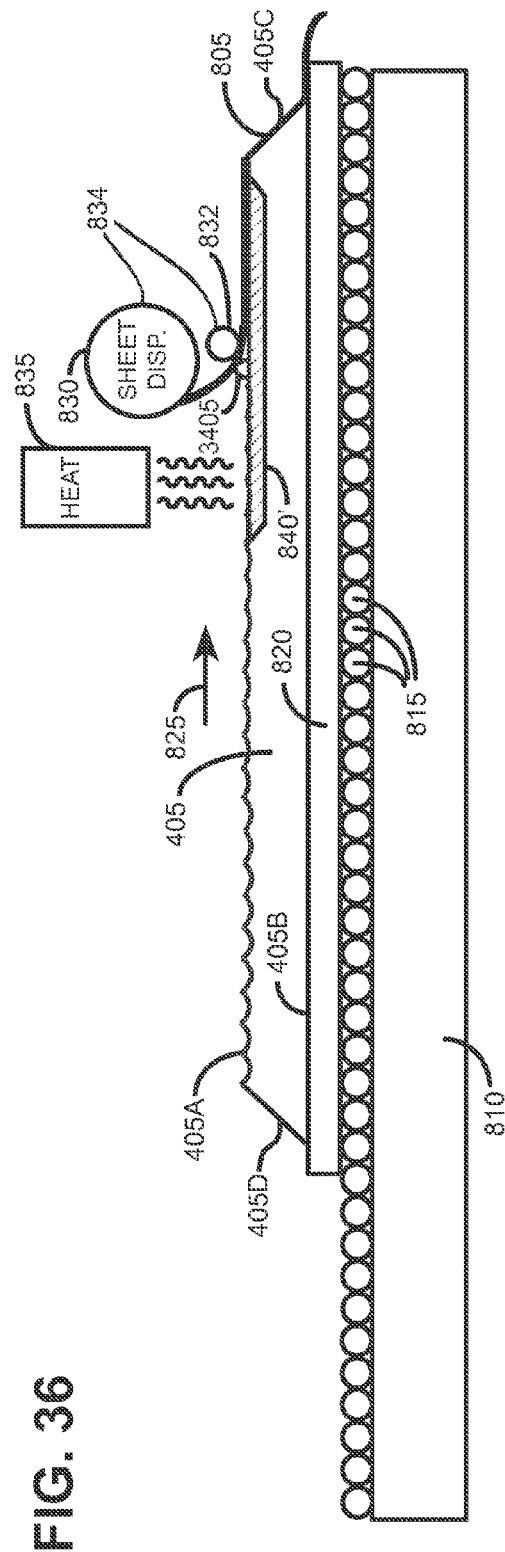
FIG. 35
FIG. 36
FIG. 37

METHOD FOR FABRICATING AN ANTI-FATIGUE MAT WITH A PRE-FORMED GEL CUSHIONING MEMBER

This patent application incorporates by reference in its entirety the U.S. Patent Application entitled "Method and Apparatus For Fabricating An Anti-Fatigue Mat", by Robert L. McMahan, Ser. No. 11/537,648, filed Sep. 30, 2006 now U.S. Pat. No. 7,754,127, that is assigned to the same Assignee as the subject patent application.

TECHNICAL FIELD OF THE INVENTION

The disclosures herein relate generally to mats and more particularly to methodology and apparatus for manufacturing resilient floor mats for reducing user fatigue.

BACKGROUND

Floor mats have been used for years to provide a cushion for the person standing on the mat. However, fatigue can still result when a person stands on a mat for an extended period of time. Persons who work standing up most of the day, such as cashiers, assembly line operators, people in home or commercial kitchens and many others still experience fatigue after standing on a conventional mat for long periods of time. Often floor mats are provided with non-slip surfaces to lessen slippage and to thus promote safety.

Mats of resilient foam are known to reduce user fatigue. Unfortunately however, some foam mats have the disadvantage of becoming brittle over time. Conventional foam mats may lose their properties as air cells in the mat compress. Moreover, conventional foam mats may collect moisture over time. This condition can promote the growth of bacteria and fungus. These undesirable characteristics may result in foam mats becoming unsuitable for use as they become older.

A mat containing gel sandwiched between various cover layers may address these problems. For example, my U.S. Pat. No. 6,851,141 discloses a resilient mat, one embodiment of which includes a resilient gel inner layer surrounded by a support ring to which an upper cover member and a lower cover member are attached. However, manufacturing such gel-based mats can be difficult.

What is needed is a method of more easily manufacturing a gel-based mat.

SUMMARY

Accordingly, in one embodiment, a method is disclosed for fabricating an anti-fatigue mat. The method may include forming a solid gel cushioning member exhibiting a predetermined geometry including first and second opposed major surfaces. The method also includes heating, by a heat source, the first major surface of the gel cushioning member to reliquefy the first major surface of the gel cushioning member. The method further includes applying a first flexible sheet to the liquefied first major surface of the gel cushioning member such that the first flexible sheet adheres to the gel cushioning member when cooled.

One embodiment of the invention also includes heating, by the heat source, the second major surface of the gel cushioning member to reliquefy the second major surface of the gel cushioning member. That method also includes applying a second flexible sheet to the liquefied second major surface of the gel cushioning member such that the second flexible sheet adheres to the gel cushioning member when cooled.

Another embodiment of the invention also includes a method wherein the heating the first major surface step includes heating, by a heat source, a portion of the first major surface of the gel cushioning member to selectively reliquefy a portion of the first major surface adjacent the portion of the first major surface. The method may also include moving the gel cushioning member to pass by the heat source such that a portion of the first major surface of the gel cushioning member adjacent the heat source is reliquefied, the heat source reliquefying different portions of the first major surface as the gel cushioning member moves by the heat source.

BRIEF DESCRIPTION OF THE DRAWINGS

The appended drawings illustrate only exemplary embodiments of the invention and therefore do not limit its scope, because the inventive concepts lend themselves to other equally effective embodiments.

FIG. 1A is a perspective view of an open-faced mold used to fabricate an anti-fatigue mat.

FIG. 1B is a cross section of the mold of FIG. 1A.

FIG. 8 is a side view cross section of the gel cushioning member situated on a conveyor before moving the gel cushioning member under a heat source to reliquefy a portion of the gel cushioning member surface facing the heat source.

FIG. 9 is a side view cross section of the gel cushioning member situated on a conveyor after moving the gel cushioning member under a heat source to reliquefy a portion of the gel cushioning member surface facing the heat source.

FIG. 12 is a side view cross section of the gel cushioning member situated on a conveyor after moving the gel cushioning member under a heat source to reliquefy still another portion of the gel cushioning member surface facing the heat source and to apply a flexible sheet material to the reliquefied another portion.

FIG. 13 is a side view cross section of the gel cushioning member situated on a conveyor after moving the gel cushioning member under a heat source to reliquefy a further portion of the gel cushioning member surface facing the heat source and to apply a flexible sheet material to a reliquefied further portion.

FIG. 14 shows the gel cushioning member after the gel cushioning member completes a pass by the heat source before application of cooling apparatus to the applied flexible support sheet.

FIG. 15 is a cross section of the gel cushioning member after completion of bonding of the flexible support sheet.

FIG. 16 is a cross section of the gel cushioning member after bonding of the flexible support sheet and after inversion in preparation for bonding of the flexible base sheet to the gel cushioning member.

FIG. 17A is a cross section of the gel cushioning member of FIG. 14 shown on the conveyer in preparation for bonding of the flexible base sheet to the gel cushioning member. The surface of the gel cushioning member is reliquefied in preparation of bonding or laminating the flexible base sheet to the gel cushioning member.

FIG. 17B shows an alternative embodiment wherein both the surface of the gel cushioning member and a surface of the flexible gel base sheet are reliquefied to bond or laminate one to the other.

FIG. 18 is a cross section of the gel cushioning member after bonding of the flexible support sheet and the flexible base sheet to the gel cushioning member. The flexible support sheet and flexible base sheet are connected to one another by a bond or other attachment mechanism adjacent the peripheral side edges of the gel cushioning member.

FIG. 19 is a cross section of the anti-fatigue mat of FIG. 17A after trimming and welding the peripheral side edges together.

FIG. 20 is a cross section of the anti-fatigue mat of FIG. 19 after inversion to the "in use" position.

FIG. 21 is a cross section of the gel cushioning member showing application of a discrete barrier or buffer layer to a reliquefied portion of the gel cushioning member.

FIG. 22 is a cross section of the gel cushioning member after completion of application of a discrete barrier or buffer layer to the gel cushioning member.

FIG. 23 is a cross section of the gel cushioning member of FIG. 22 before application of a flexible base sheet to the discrete barrier layer.

FIG. 24 is a cross section of the gel cushioning member of FIG. 22 after application of a flexible base sheet to the discrete barrier layer to form the anti-fatigue mat. The flexible support sheet and flexible base sheet are connected to one another by a bond or other attachment mechanism adjacent the peripheral side edges of the gel cushioning member FIG. 25A is a cross section of the anti-fatigue mat of FIG. 24 after trimming and welding the flexible base sheet and flexible support sheet together adjacent the peripheral side edges of the mat.

FIG. 25B shows a more detailed cross section of the mat assembly of FIG. 25A as including the gel cushioning member, flexible support sheet, buffer sheet and flexible base sheet.

FIG. 26 shows a cross section view of the completed anti-fatigue mat in the "in use" position.

FIG. 27 depicts an alternative embodiment of the disclosed mat fabrication methodology wherein the heat source moves across the gel cushioning member to selectively reliquefy portions of the surface of the gel cushioning member.

FIG. 28 depicts the embodiment of FIG. 27 as the heat source reaches the gel cushioning member and starts to reliquefy an adjacent portion of the surface of the gel cushioning member.

FIG. 35 is a cross section side view of an alternative gel cushioning member with a surface that includes recesses across the gel surface to consume or reduce the gel wave front.

FIG. 36 shows the gel cushioning member of FIG. 35 in use to consume or reduce the gel wave front during application of a flexible sheet to a reliquefied portion of the gel cushioning member surface.

FIG. 37 is a cross section side view an alternative gel cushioning member similar to that of FIG. 35 except with recesses on both opposed major surfaces of the gel cushioning member.

DETAILED DESCRIPTION

The drawings presented describe an anti-fatigue mat and a process for fabricating an anti-fatigue mat. FIG. 1A is a perspective view of an open-faced mold 105 that is useful to form a resilient cushioning member of an anti-fatigue mat, as discussed in more detail below. FIG. 1B is a cross section of open-faced mold 105 taken along section line 1B-1B. Open-faced mold 105 includes an open region or cavity 110 that receives resilient material to form the resilient cushioning member.

Figure 2:
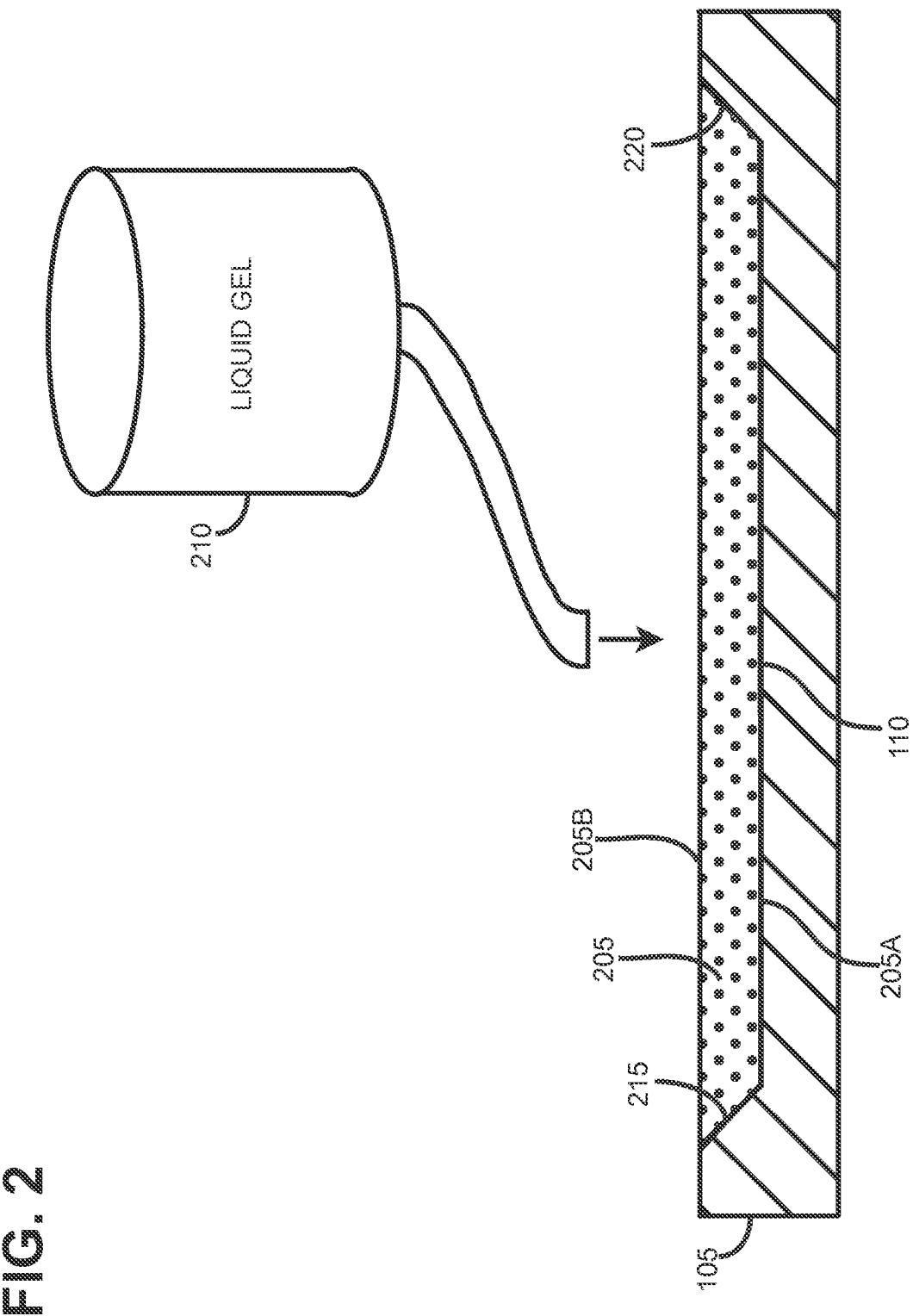
FIG. 2 is a view of the open-faced mold of FIG. 1B after filling with gel material to form a gel cushioning member.

In more detail, FIG. 2 shows open-faced mold 105 with open region 110 that is configured to receive resilient material, such as liquid gel, to form resilient cushioning member 205. Resilient cushioning member 205 may be formed of a viscoelastic polymer material such as a synthetic rubber-based gel, a polyurethane-based gel or a silicone-based gel. Resilient cushioning member 205 is also referred to as gel cushioning member 205. FIG. 2 shows a supply 210 of resilient material such as liquid gel. Supply 210 provides liquid gel to the open region 110 of mold 105. Open region 110 may also be referred as gel receiving cavity 110. In one embodiment, supply 210 maintains the gel therein at a sufficiently high temperature to keep the gel in the liquid state. After gel supply 210 provides the liquid gel to mold 105, the gel in mold 105 is allowed to cool until the gel is cast into a solid state that exhibits a resilient nature. The term "solid" as used herein refers to the state of matter of the gel, wherein the state of matter may be one of the solid, liquid and gaseous states. Forming the liquid gel 210 into a solid gel cushioning member 205 by casting before fabricating the anti-fatigue mat makes it easier to handle gel cushioning member 205 while assembling the anti-fatigue mat. A cold plate or other cooling apparatus may optionally be applied to gel cushioning member 205 to decrease the time member 205 takes to solidify. Gel cushioning member 205 may be stored as a solid pre-formed gel cushioning member until the time the anti-fatigue mat is fabricated. Pre-forming gel cushioning member 205 may be helpful in terms of maintaining inventory. More particularly, with this approach a manufacturer may produce and stockpile a large number of pre-formed gel cushioning members. Then, at a later time, for example when the manufacturer receives an order for a particular mat color and texture, the manufacture may customize the mat by installing flexible cover sheets with the ordered color and texture on the gel member to complete the mat as per the order. These flexible cover sheets (not shown) respectively cover the opposed major surfaces 205A and 205B of pre-formed gel cushioning member 205

In one embodiment, mold 105 includes bevelled or sloped side surfaces 215 and 220 to provide gel cushioning member 205 with corresponding bevelled or angularly sloped side surfaces that provide a non-trip feature to the completed anti-fatigue mat. While the illustrations herein show a generally rectangular mold 105 and a corresponding generally rectangular gel cushioning member 205, other geometries such as for example squares, circles, and ovals, are also possible depending on the geometry selected for open region 110 of mold 105.

Figure 3:
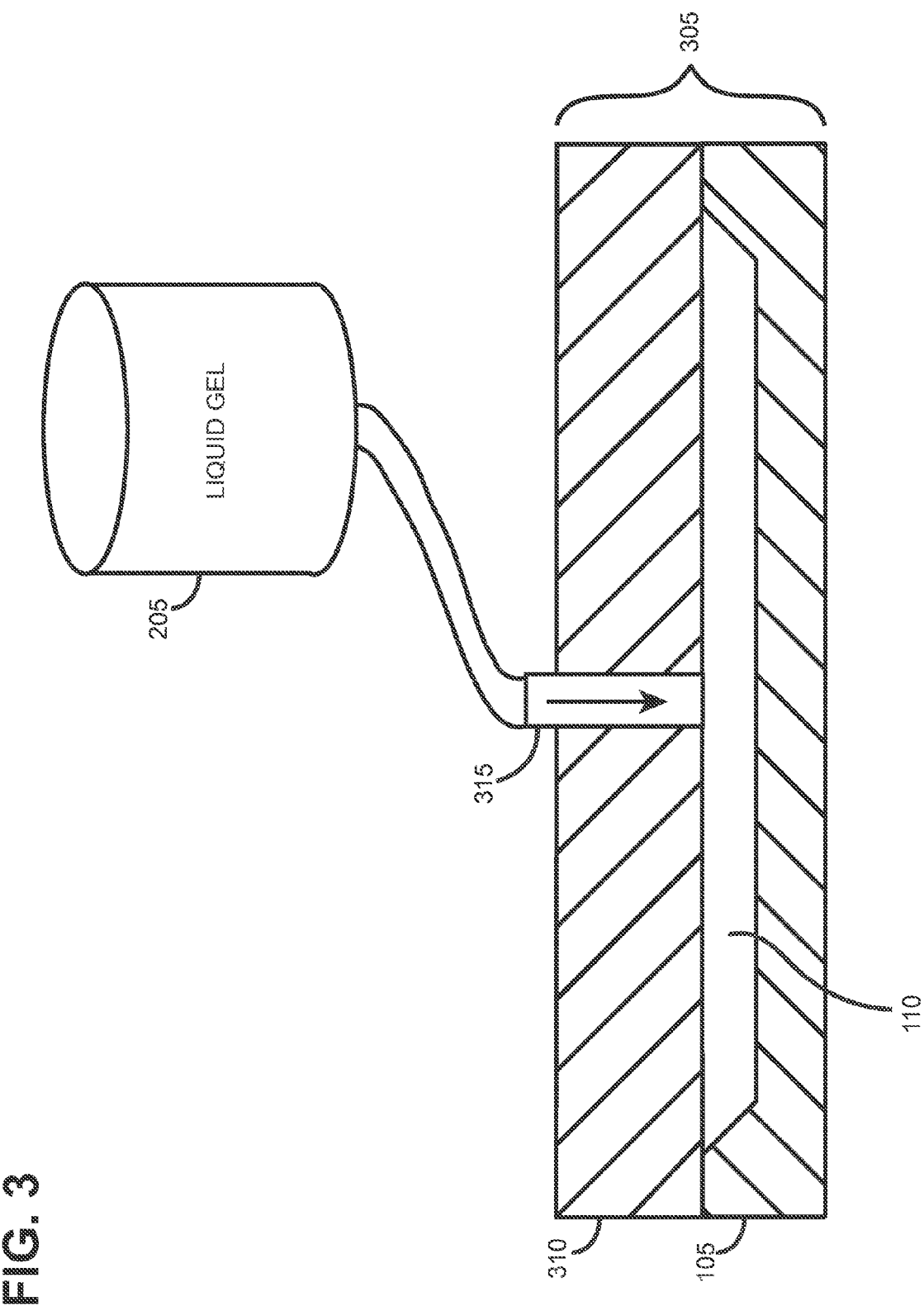
FIG. 3 is a view of a cross section of an injection-mold before filling with gel material to form the gel cushioning member.

FIG. 3 shows an injection mold assembly 305 that includes a lower mold 105 similar to the mold of FIG. 1. Injection mold assembly 305 also includes an upper mold 310 that mates with lower mold 105 to form an open region or cavity 110 as shown in FIG. 3. Upper mold 305 includes a channel 315 through which liquid gel may flow from supply 205 to open region 110.

Figure 4:
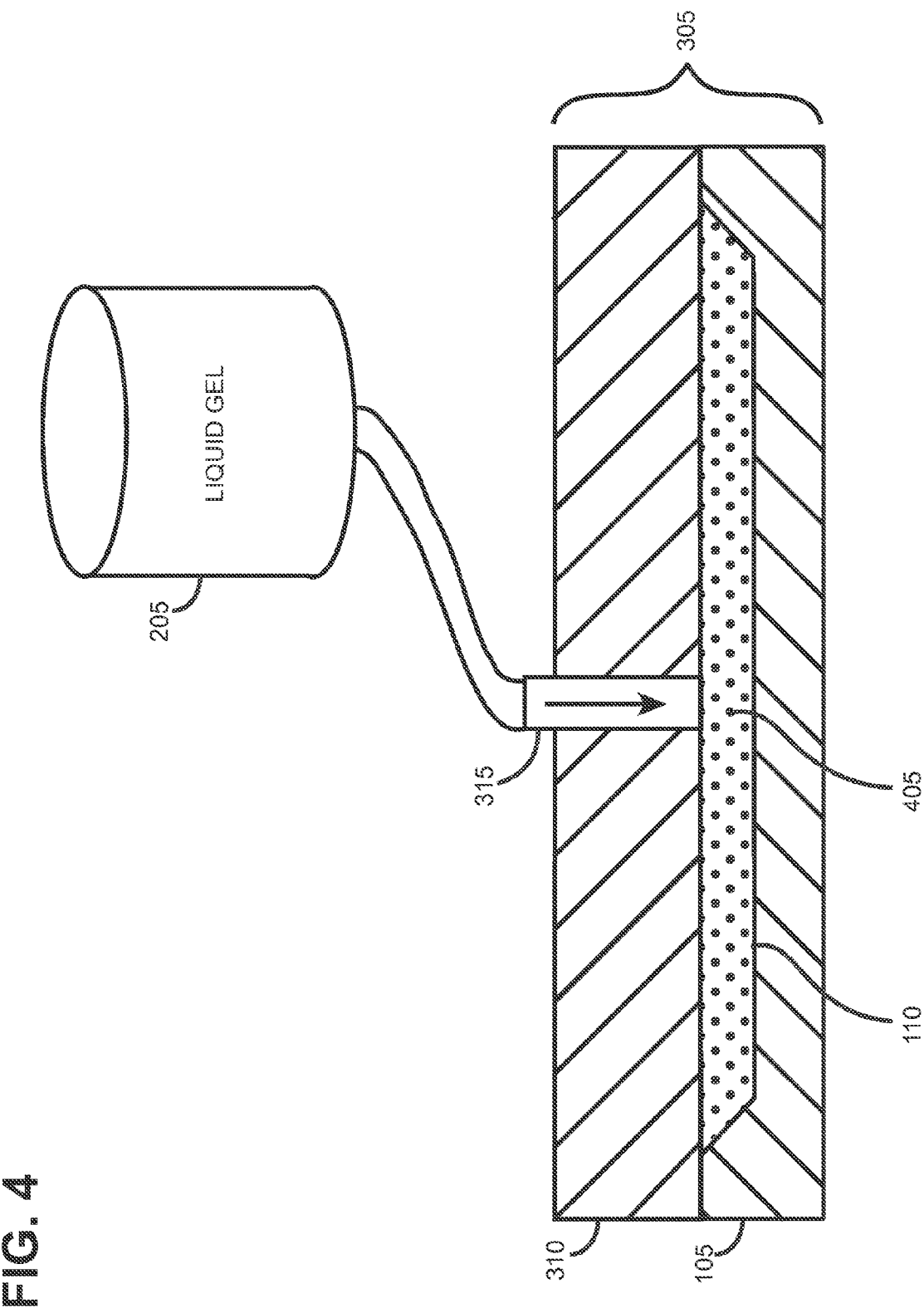
FIG. 4 is a view of a cross section of an injection-mold after filling with gel material to form the gel cushioning member.
Figure 5:
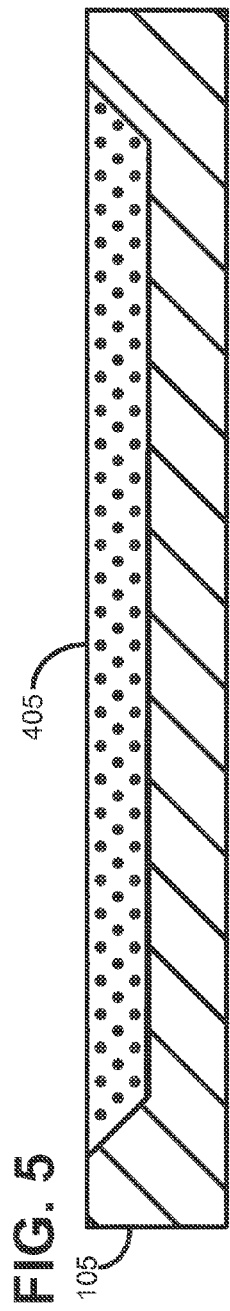
FIG. 5 is a cross section of an open-faced mold with a gel cushioning member in the mold.
Figure 6:
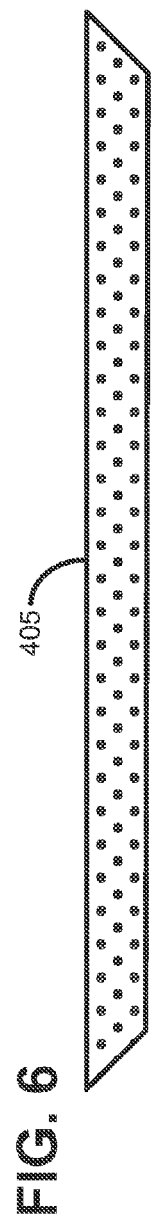
FIG. 6 is a cross section of the gel cushioning member after removal from the mold.
Figure 7A:
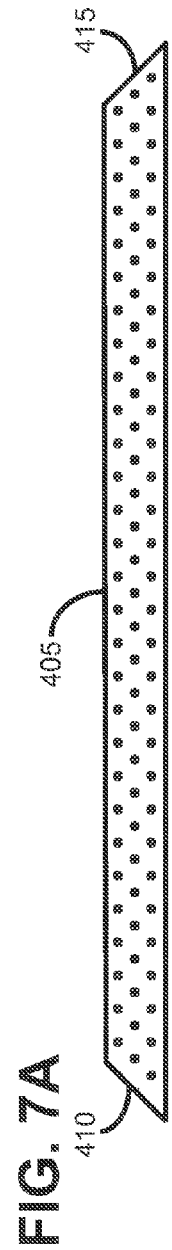
FIG. 7A is a cross section of the gel cushioning member after removal from the mold and after rotation to an "in use" position.

FIG. 4 shows the injection mold assembly 305 after supply 205 injects heated liquid gel into open region 110 to form gel cushioning member 405. The liquid gel is allowed to cool and solidify. Lower mold 105 and/or upper mold 310 of injection mold assembly 305 may include integral cooling channels and cooling lines to cool the liquid gel that gel supply 205 delivers to injection mold assembly 205. Alternatively, a cold plate is optionally applied to gel cushioning member 405 to cool and solidify gel cushioning member 405 more quickly. After gel cushioning member 405 cools and solidifies, upper mold 310 is removed from injection mold assembly 305 leaving gel cushioning member 405 in lower mold 105 as shown in FIG. 5. Gel cushioning member 405 is removed from lower mold 105 as shown in FIG. 6. Gel cushioning member 405 may be inverted to the "in use" position as shown in FIG. 7A. Gel cushioning member 405 may include bevelled or angularly sloping sides or edges such as bevelled edges 410 and 415. These bevelled edges 410 and 415 help provide a non-trip feature to the completed anti-fatigue mat.

Figure 7C:
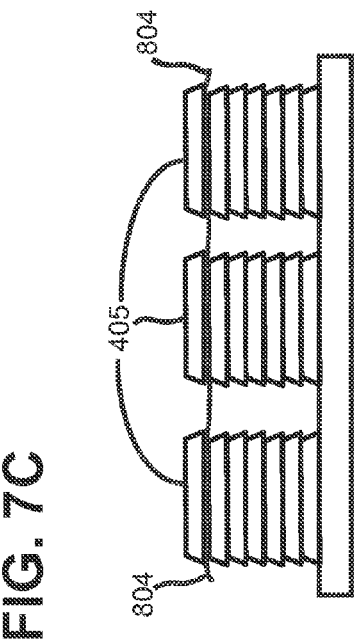
FIG. 7C shows multiple prefabricated gel cushioning members separated by a release liner to prevent the gel cushioning members from sticking to one another.
Figure 7B:
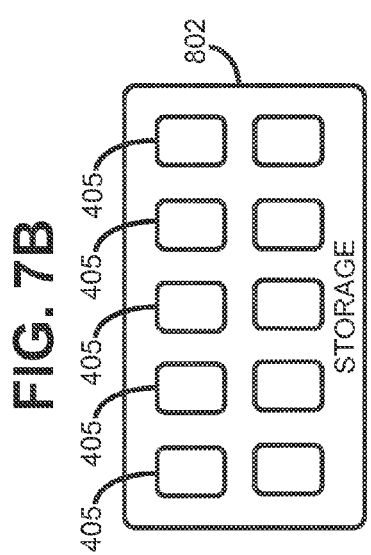
FIG. 7B shows multiple prefabricated gel cushioning members in a storage configuration.

It is noted that as described above, resilient gel cushioning member 405 is a solid preformed or prefabricated gel member that was previously liquid gel but is now a solid gel exhibiting a predetermined geometry. Gel cushioning member 405 is a resilient solid gel before being placed on a carrier for further processing as described below in connection with FIG. 8. Gel cushioning member 205 may be used in place of gel cushioning member 405 in the processes described below. Although different processes were used to prefabricate gel cushioning members 205 and 405 with predetermined geometries, either of these two solid gel cushioning members may be used in the mat fabrication processes below. For convenience, however, the following discussion refers to the gel cushioning member as gel cushioning member 405 although either gel cushioning member may be used. In one embodiment, gel cushioning members 205 and 405 are prefabricated gel cushioning members. Prefabricated gel cushioning members 205 and 405 are made in solid form and may be held in inventory storage prior to being used to build an anti-fatigue mat. For example, a number of pre-formed or prefabricated gel cushioning members 405 may be held in storage 802 as shown in FIG. 7B prior to attaching flexible sheets thereto in accordance with FIGS. 8-20 below. Alternatively, gel cushioning members 405 may be stacked one above the other with a release liner such as release liner 804 being situated between the stacked gel cushioning members 405 to prevent the gel cushioning members 405 from sticking to one another, as shown in FIG. 7C. For convenience, only one release liner 804 is illustrated in FIG. 7C. In one embodiment, each cushioning member 405 may be separated vertically and horizontally from adjacent gel cushioning members 405 by a release liner 804.

As seen in FIG. 8, gel cushioning member 405 includes an upper surface 405A that faces the mat user after mat completion. Cushioning member 405 also includes a lower surface 405B that faces the floor or other surface on which the completed mat will be placed for use. Upper surface 405A and lower surface 405B are opposed major surfaces of gel cushioning member 405. After gel cushioning member 405 cools to the solid state, the anti-fatigue mat fabrication process continues with, first, the application of a flexible support sheet to upper surface 405A of cushioning member 405 and then, second, with the application of a flexible base sheet to the remaining surface 405B of gel cushioning member 405. Alternatively, this order of sheet placement may be reversed if desired.

FIG. 8 shows a process for adhering or bonding a flexible support sheet 805 to gel cushioning member 405. More particularly, FIG. 8 shows a portion of an assembly line including a conveyor 810 with rollers 815 along the top of the conveyor 810. Alternatively, conveyor 810 may be a belt-type conveyor. Gel cushioning member 405 is situated or positioned on top of a shuttle or carrier 820 that moves at a controlled speed along conveyer 810 in the direction that arrow 825 indicates. A roll 830 of flexible support sheet material 805 acts as a sheet dispenser while carrier 820 with gel cushioning member 405 moves along conveyor 810 below heat source 835 and sheet dispenser 830. Sheet dispenser 830 together with spring-loaded pressure roller 832 form an applicator 834 that will apply the flexible sheet from sheet dispenser 830 to a selectively reliquefied portion of the surface of gel cushioning member 405. Controller 840 determines or selects the portion of the gel member surface 405A that is currently reliquefied by controlling the movement and speed of carrier 820 and gel cushioning member 405 as they pass by heat source 835 and sheet applicator 834.

Controller 840 may stop or start the movement of carrier 820 and gel cushioning member 405. Controller 840 may move carrier 820 and gel cushioning member 405 laterally past heat source 835 and applicator 834 in a series of stop/start steps or in a continuous motion, depending on the particular application. In one embodiment, sheet dispenser 830 provides a flexible support sheet 805 that includes a decorative fabric to improve the appearance of the mat. For example, a synthetic leather material may be bonded to a fabric backing material to form flexible support sheet 805. Support sheet 805 may thus provide a cosmetically appealing surface.

As seen in FIG. 9, heat source 835 locally reliquefies a selected portion 840 of the upper surface of gel cushioning member 405 passing below heat source 835 such that when sheet 805 contacts the liquefied portion 840, sheet 805 adheres and bonds to cushioning member 405 at liquefied portion 840. In one embodiment, the selected portion of gel cushioning member 405 that is reliquefied is the portion of the upper surface of gel cushioning member 405 that is adjacent to heat source 835. In this embodiment, heat source 835 is mounted to a fixed mount 837 such that heat source 835 remains at a stationary location "A" while gel cushioning member 405 and carrier 820 move past heat source 835 under the control of a controller 840. Controller 840 may adjust the speed at which gel cushioning member 405 moves past heat source 835 to control the rate at which flexible support sheet 805 is applied to the reliquefied portion 840.

Figure 10:
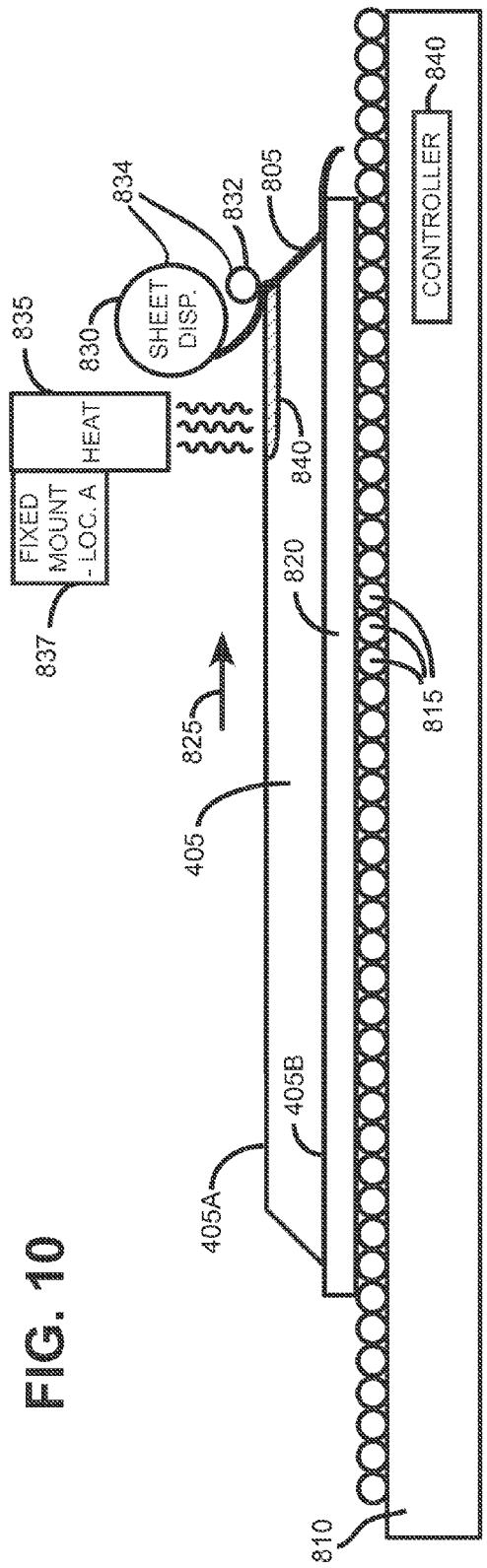
FIG. 10 is a side view cross section of the gel cushioning member situated on a conveyor after moving the gel cushioning member under a heat source to reliquefy a portion of the gel cushioning member surface facing the heat source and to apply a flexible sheet material to the reliquefied portion.
Figure 11:
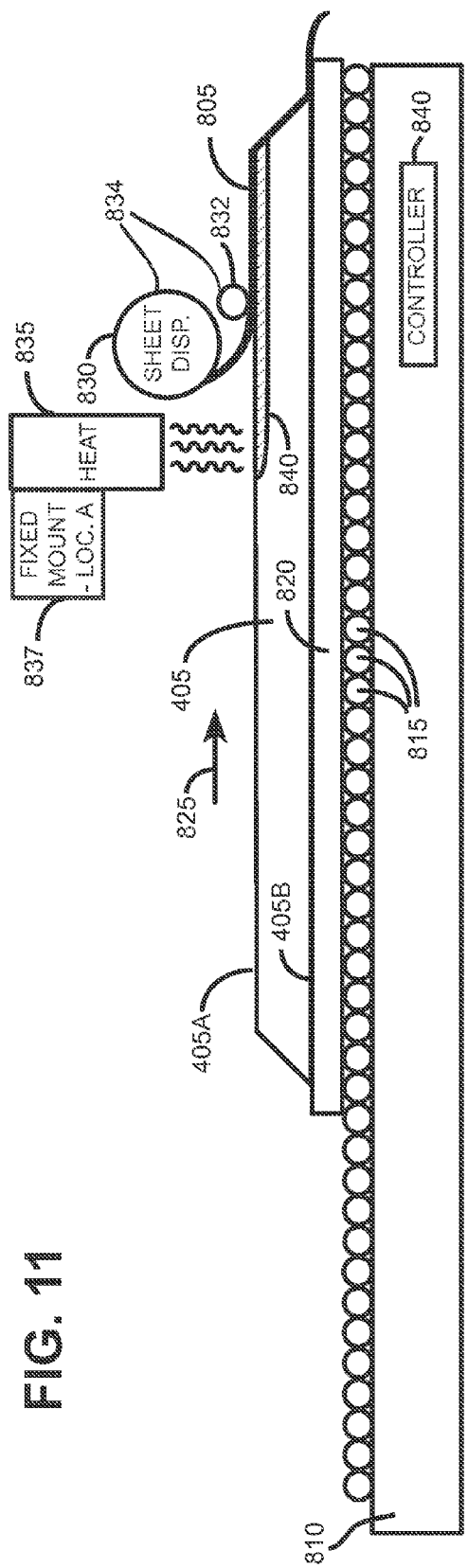
FIG. 11 is a side view cross section of the gel cushioning member situated on a conveyor after moving the gel cushioning member under a heat source to reliquefy another portion of the gel cushioning member surface facing the heat source and to apply a flexible sheet material to the reliquefied another portion.

Cushioning member 405 on carrier 820 continues moving in the direction of arrow 825 under manual control or automatic control of controller 840. As cushioning member 405 continues moving in the direction of arrow 825, a larger and larger portion of upper surface 405A reliquefies and becomes liquefied portion 840. Sheet dispenser or roll 830 continues dispensing or paying out more flexible support sheet 805 onto the selectively reliquefied upper surface 405A as seen in FIG. 10. A spring-loaded roller 832 presses support sheet 805 against the selectively liquefied portion 840 of gel cushioning member 405 to assist in bonding support sheet 805 to gel cushioning member 405. Gel cushioning member 405 continues moving in the direction of arrow 825 and the liquefied portion 840 continues forming on upper surface 405A as seen in FIG. 11. More of sheet 805 becomes bonded to upper surface 405A of cushioning member 405 as the liquefied portion cools and again solidifies. The portion of liquefied portion 840 most distant from heat source 835 may cool and solidify first. An optional accelerated cold plate cooling technique for cooling and resolidifying the reliquefied portion 840 after application of support sheet 805 is discussed below. As seen in FIG. 12, reliquefied portion 840 continues to grow as gel cushioning member 405 moves by heat source 835 under the direction of controller 840. As seen in FIG. 13, heat source 835 continues liquefying a larger and larger portion of gel cushioning member 405 as gel cushioning member 405 continues advancing along conveyer 810 in the direction of arrow 825. In one embodiment, while heat source 835 liquefies portion 840 of gel cushioning member 405 as shown in FIG. 14, it does not liquefy portion 840 so deeply as to cause gel cushioning member 405 to lose its structural integrity.

Gel cushioning member 405 on carrier 820 continues moving in the direction of arrow 825 until the remainder of the upper surface 405A of gel cushioning member 405 becomes liquefied and bonds to sheet 805 as sheet 805 dispenses onto the liquefied portion 840. FIG. 14 shows gel cushioning member 405 after application of sheet 805 to the entire upper surface 405A of cushioning member 405. In one embodiment, the entire upper surface 405A of cushioning member 405 is not reliquefied at a particular point in time, but rather the liquefied portion 840 effectively moves along the upper surface 405A as gel cushioning member 405 moves on carrier 820 past heat source 835. Thus, the portion of upper surface 405A onto which sheet 805 is dispensed is selectively reliquefied, and other portions of upper surface 405A may remain solid until sheet 805 is dispensed onto such other portions. The disclosed mat fabrication process selectively reliquefies a changing portion of the upper surface 405A of gel cushioning member 405 before flexible support sheet 805 contacts and bonds to that portion of surface 405A. The region of reliquefied portion 840 most distant from heat source 835 may cool first and may solidify before the remainder of the reliquefied portion 840. To accelerate the completion of bonding of flexible support sheet 805 to the upper surface 405A of gel cushioning member 405, an optional cold plate 845 may be moved in the direction of arrow 850 to contact support sheet 805. This draws the heat from the liquefied portion 840 below support sheet 805 to cool the reliquefied portion 840 and complete the process of bonding support sheet 805 to gel cushioning member 405.

FIG. 15 shows cushioning member 405 with flexible support sheet 805 bonded to the upper surface 405A. To continue with the fabrication of the anti-fatigue mat, the gel cushioning member 405 with sheet 805 assembly of FIG. 15 is inverted, as shown in FIG. 16, to receive a flexible base sheet on surface 405B. FIG. 16 shows gel cushioning member 405 prior to bonding of a flexible base sheet to surface 405B.

Referring now to FIG. 17A, using the same selected reliquefication and bonding methodology discussed above with respect to bonding support sheet 805 to gel surface 405A, the disclosed process selectively reliquefies a portion of gel surface 405B to bond a flexible base sheet 1705 to surface 405B. A roll 1730 of flexible base sheet material 1505 acts as a sheet dispenser while carrier 820 with gel cushioning member 405 passes along conveyor 810 below heat source 835 and sheet dispenser 1730. Flexible base sheet 1705, like support sheet 805, may be fabricated from flexible material such as vinyl. Base sheet 1705 is intended to provide a high friction or non-slip surface so that when placed on the floor, the mat is stable and does not slide during use. One material that may be employed for base sheet 1705 is a high friction vinyl or urethane laminated to a fabric backing.

As seen in FIG. 17A, heat source 835 reliquefies a selected portion 1740 of surface 405B of gel cushioning member 405 passing below heat source 835 such that when base sheet 1705 contacts the liquefied portion 1740, sheet 1705 adheres and bonds to cushioning member 405 at liquefied portion 1740. This reliquefication of surface 405B as gel cushioning member 405 and carrier 820 move in the direction of arrow 825 continues until all of surface 405B is selectively reliquefied and bonded to flexible base sheet 1705. In one embodiment, all of surface 405B need not be reliquefied at the same time. Rather, just the selected portion of surface 405B being bonded to base sheet 1705 needs to be reliquefied at a particular point in time. In another embodiment, it may be desirable to reliquefy the entirety of surface 405B at the same time prior to bonding base sheet 1705 to surface 405B. Likewise, in an alternative embodiment, just the portion of surface 405A being bonded to support sheet 805 needs to be reliquefied at a particular point in time. It may also be desirable to reliquefy the entirety of surface 405A at the same time prior to bonding support sheet

805 to surface 405A. The same cooling techniques discussed above may also be applied to cool reliquefied portion 1740 below base sheet 1705.

FIG. 18 shows gel cushioning member 405 after bonding of both flexible base sheet 1705 and flexible support sheet 805 to gel cushioning member 405. Sheets 805 and 1705 are then connected together adjacent the peripheral side edge. For example, sheets 805 and 1705 may be glued together, sewn together, RF welded together or bonded together adjacent the peripheral side edges of the mat assembly of FIG. 18 near locations 1750 and 1755, respectively. More detail with respect to connecting sheets 805 and 1705 together is disclosed in the patent application entitled "Method and Apparatus For Fabricating An Anti-Fatigue Mat Employing Multiple Durometer Layers", application Ser. No. 12/016,198, filed Jan. 17, 2008 and assigned to the same assignee, the disclosure of which is incorporated herein by reference in its entirety. To complete the fabrication of the anti-fatigue mat, the mat assembly of FIG. 18 is cut near the peripheral edge of the mat at locations 1750 and 1755 where sheets 1705 and 805 overlap. When the cutting and sheet connecting steps are complete, the completed anti-fatigue mat appears as mat 1900 of FIG. 19 wherein the mat is in the inverted position after removal from carrier 820.

Before use, mat 1900 is placed in the "in use" position shown in FIG. 20 wherein support sheet 805 faces the user and base sheet 1705 faces the floor or other surface while the mat is "in use". In one embodiment, support sheet 805 includes a decorative fabric to improve the appearance of the mat. For example, a synthetic leather material may be bonded to a fabric backing material to form flexible support sheet 805. When the user stands on mat 1900, the support sheet 805 is oriented upward so that the decorative fabric is visible to the user. Support sheet 805 may thus provide a cosmetically appealing surface. Flexible base sheet 1705 faces downward toward the floor or other usage surface. Base sheet 1705 is intended to provide a high friction or non-slip surface so that when placed on the floor, the mat is stable and does not slide during use. One material that may be employed for base sheet 1705 is a high friction vinyl or urethane laminated to a fabric backing.

Gel cushioning member 405 is fabricated from a resilient gel material that provides a very pleasing feel when the user steps on the fully assembled mat 1900. This is especially true when the user steps on the mat without wearing shoes. In one embodiment, the durometer or softness of gel cushioning member 405 should be sufficiently high that it is comfortable for the user to step on the mat and yet sufficiently firm that the user is stable when standing on the mat. Stability here refers to the avoidance of undue lateral motion when standing on the mat. In one embodiment, gel cushioning member 405 may be formed of any synthetic rubber material that includes thermoplastic rubber and mineral oil provided that the durometer of gel cushioning member 405 is as described above.

In one embodiment, a buffer layer (not separately shown in FIGS. 17A and 18) of polyurethane is sprayed or otherwise applied to the inner side of base sheet 1705 that faces gel cushioning member 405. An alternative to spraying the buffer layer on base sheet 1705, is to laminate a polyurethane or polyolefin film on the inner side of base sheet 1705. This film may be glued to the inner side of base sheet 1705 with adhesive to provide a buffer layer. A metallic foil is an example of another material that may be used as the buffer layer between gel member 405 and base sheet 1705. The buffer layer acts to slow down or impede the movement of liquid or oil within gel member 405 to other structures of the mat. In one embodiment, cotton twill is used as a buffer layer between gel member 405 and base sheet 1705. While adhesive may be used to laminate the above-described buffer layer to the inner surface of base sheet 1705 on one side of the mat, the above-described reliquefication process may be used to attach or adhere support sheet 805 to gel member 405 on the opposed side of the mat.

In yet another embodiment, another buffer layer (not separately shown) is similarly applied to the inner side of support sheet 805 that faces gel cushioning member 405. In actual practice, these buffer layers may be applied to support sheet 805 and base sheet 1705 of FIG. 18 prior to bonding of these sheets to gel cushioning member 405. The buffer layers prevent or decrease mineral oil in gel cushioning member 405 from undesirably migrating from gel cushioning member 405 through base sheet 1705 or support sheet 805 to the exterior of the mat. These two buffer layers are integral buffer layers or barrier layers because they are applied to their respective flexible sheets before the flexible sheets are bonded to gel cushioning member 405. In one embodiment, the buffer layer or barrier layer between support sheet 805 and gel cushioning member 405 may be omitted. For example, FIG. 17A shows one step in the fabrication of an anti-fatigue mat wherein flexible base sheet 1705 includes an integral buffer layer on the side thereof that faces gel cushioning member 405. In this manner, a liquid such as oil that may be present in gel cushioning member 405 does not leach out of gel cushioning member 405 and travel through flexible base sheet 1705 to reach a surface on which the mat may rest when in use.

In an alternative embodiment, the disclosed methodology may be used to deposit or attach a sheet of gel material on gel cushioning member 405. For example, a sheet of gel may be used as flexible base sheet 1705 on sheet dispenser 1730 of FIG. 17A. The exposed surface of gel member 405 is then reliquefied by heat source 835. Dispenser 1730 applies gel sheet 1705 to the reliquefied surface of gel member 405. When gel member 405 cools, gel sheet 1705 adheres to gel member 405. This methodology forms a gel-to-gel lamination.

FIG. 17B shows another alternative embodiment wherein both the surface of the gel cushioning member 405 and a flexible gel base sheet 1705 are reliquefied to bond or laminate one to the other. The process of laminating the flexible gel base sheet 1705 to gel cushioning member 405 is similar to that depicted in FIG. 17A, except that heat source 835' and fixed mount 837' are configured such that heat source 835' liquefies a portion 1760 of flexible gel base sheet 1705 and further liquefies a portion 1740 of the upper surface 405B of gel cushioning member 405 when gel cushioning member 405 moves in the direction of arrow 825. The heating action of heat source 825' liquefies adjacent gel cushioning member 405 to form liquefied portion 1740 and further liquefies the adjacent portion of flexible gel base sheet 1705 to form liquefied portion 1760. The liquefied portion 1760 of flexible gel base sheet 1705 bonds to the liquefied portion 1740 of gel cushioning member 405 when they contact each other at roller 832. In one embodiment, flexible gel base sheet 1705 is sufficiently thick that it does not lose structural integrity when heated by heat source 835'. In FIG. 17A, the depth to which the exposed surface of gel cushioning member 405 is liquefied to form liquefied portion 1740 is exaggerated for illustration purposes. In one embodiment, liquefied portion 1740 is liquefied to a depth sufficient to bond to gel base sheet 1705 when gel cushioning member contacts gel base sheet 1705 at roller 832. Sheet dispenser 1730 may employ a release liner to prevent gel layer 1705 from adhering to itself in sheet dispenser 1730. This gel reliquefication methodology forms a gel-to-gel lamination.

As an alternative to the integral buffer layer embodiment described above wherein a buffer layer or barrier layer is applied to a flexible support sheet or flexible base sheet before the flexible sheet is bonded to the gel cushioning member 405, it is also contemplated that a buffer layer be a discrete flexible layer that is applied to one of, or both of, the opposed major surfaces 405A and 405B of gel cushioning member 405 before the flexible support sheet and flexible base sheets are bonded thereto. Each of major surfaces 405A and 405B may have its own buffer layer attached thereto. FIG. 21 shows an embodiment of the mat that includes a discrete buffer sheet or barrier layer 2105 that is rolled onto a selectively reliquefied portion 1740 of gel cushioning member 405. Discrete buffer layer 2105 extends between locations 2205 and 2210 at the peripheral side edges of gel cushioning member 405 as shown in FIG. 22. Discrete buffer layer 2105, gel cushioning member 405 and flexible support sheet 805 together form a sandwich structure. After application or bonding of discrete buffer layer 2105 to gel cushioning member 405, a flexible base sheet 2110 is applied to the mat assembly as shown in FIG. 23 to form the mat assembly of FIG. 24. The peripheral edges of the mat assembly of FIG. 24 are cut or trimmed near the peripheral side edges of the mat at locations 1750 and 1755 where sheets 2110 and 805 overlap to form the mat assembly of FIG. 25A. FIG. 25B shows a more detailed cross section of the mat assembly of FIG. 25A as including gel cushioning member 405, flexible support sheet 805, buffer sheet 2105 and flexible base sheet 2110. The mat assembly of FIG. 25B is inverted for use as shown in FIG. 26.

In the above described embodiments, a solid gel cushioning member 405 moves on carrier 820 past a stationary heat source 835 to form the selectively reliquefied portion of gel cushioning member 405 while gel cushioning member 405 passes by. In that embodiment, heat source 835 remains stationary at location "A". However, it is also possible that heat source 835 of FIG. 8 may move under the direction of a controller 2701 across the upper surface 405A of gel cushioning member 405 to form the selectively reliquefied portion 840 that is to be bonded to the support sheet 805. In this embodiment, heat source 835 is situated on a motor-driven movable mount 2705 as shown in FIG. 27. Motor-driven movable mount 2705 is coupled to controller 2701. Heat source 835 starts moving from an initial position at location "B" and then moves in the direction of arrow 2710 across gel cushioning member 405. As shown in FIG. 28, sheet dispenser 830 may move in tandem with heat source 835 under the direction of controller 2701 to dispense support sheet 805 to the reliquefied portion 840 of gel cushioning member 405 starting at location "C" for bonding purposes as shown in FIG. 28.

Figure 29:
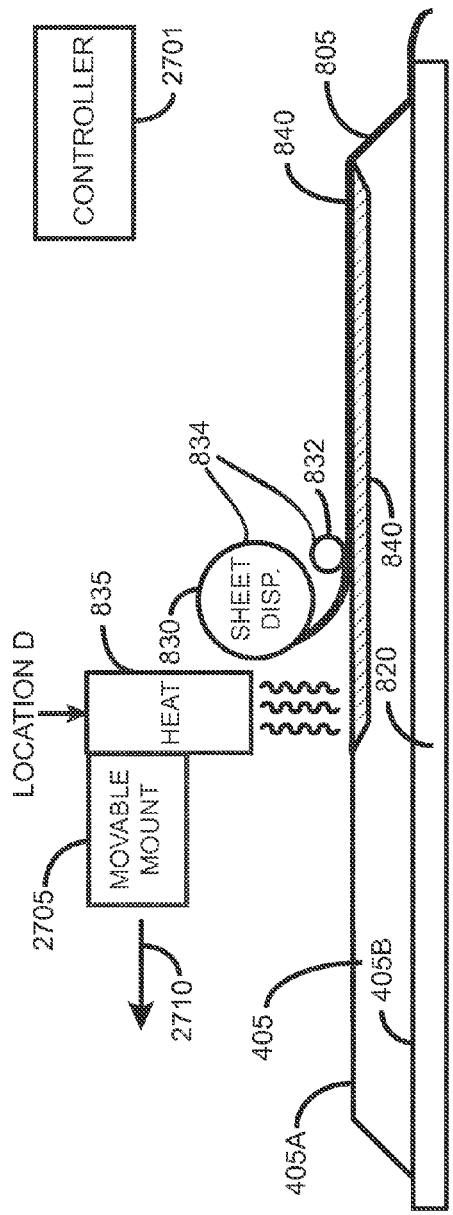
FIG. 29 depicts the embodiment of FIG. 28 as the heat source continues to move across the surface of the gel cushioning member and reliquefies different adjacent portions of the surface of the gel cushioning member while a dispenser applies a flexible sheet to the reliquefied portions.
Figure 30:
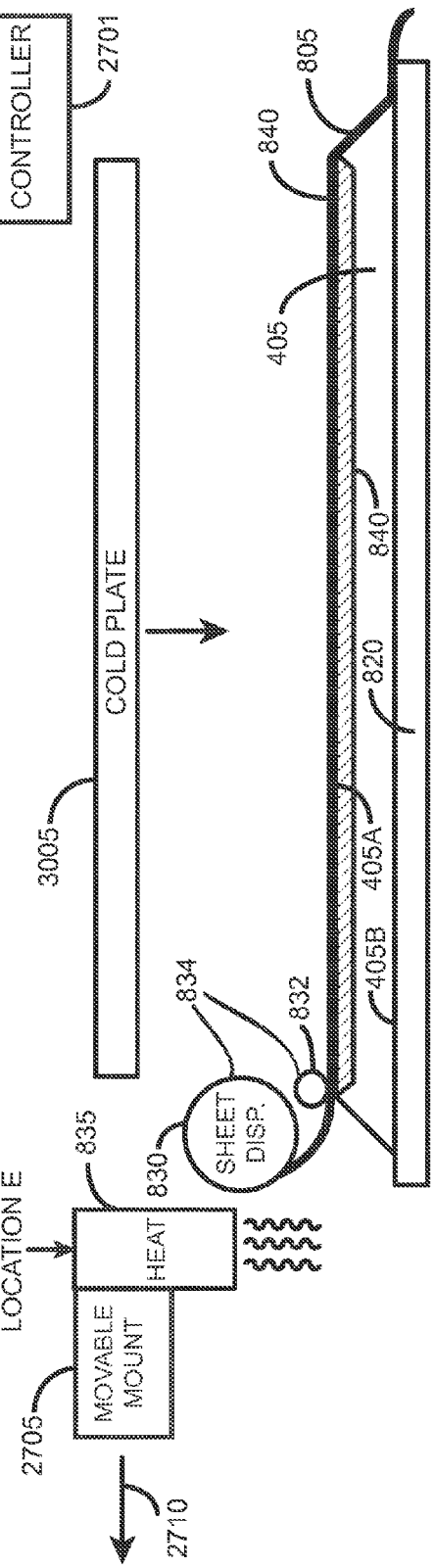
FIG. 30 depicts the embodiment of FIG. 29 as the heat source completes reliquefication of the gel cushioning member surface and the dispenser completes application of the flexible sheet to that surface.

The controller 2701 continues to instruct movable mount 2750 and heat source 835 to move in the direction of arrow 2710 toward location "D" as shown in FIG. 29. In this manner, the selectively reliquefied portion 840 may enlarge as shown and flexible support sheet 805 continues to be applied to and bonded to that reliquefied portion. As movable mount 2705 and heat source 835 continue to move across the mat assembly toward location "E", sheet dispenser 830 continues to pay out and apply flexible support sheet 805 to the liquefied portion 840 as shown in FIG. 30. To speed up the solidification of liquefied portion 840 below flexible support sheet 805, a cold plate 3005 may be applied to flexible support sheet 805 after application to gel cushioning member 405 as shown in FIG. 30.

In this manner, heat source 835 is controllably moved across the mat to enable bonding of flexible support sheet 805 to the liquefied surface 405A of gel cushioning member 405. A similar method is usable to apply or bond a flexible base sheet and/or a buffer layer to lower surface 405B of gel cushioning member 405. More particularly, movable mount 2705 and heat source 835 may be controllably moved across the lower surface 405B of gel cushioning member 405 to form the reliquefied portion of that surface for purposes of bonding the flexible base sheet or buffer layer to the gel cushioning member 405. The sheet dispenser may move in tandem with heat source 835 to dispense a base sheet to the reliquefied portion of base sheet for bonding purposes. Gel cushioning member 405 may be inverted from the position depicted in FIG. 30 before this bonding commences.

Figure 31:
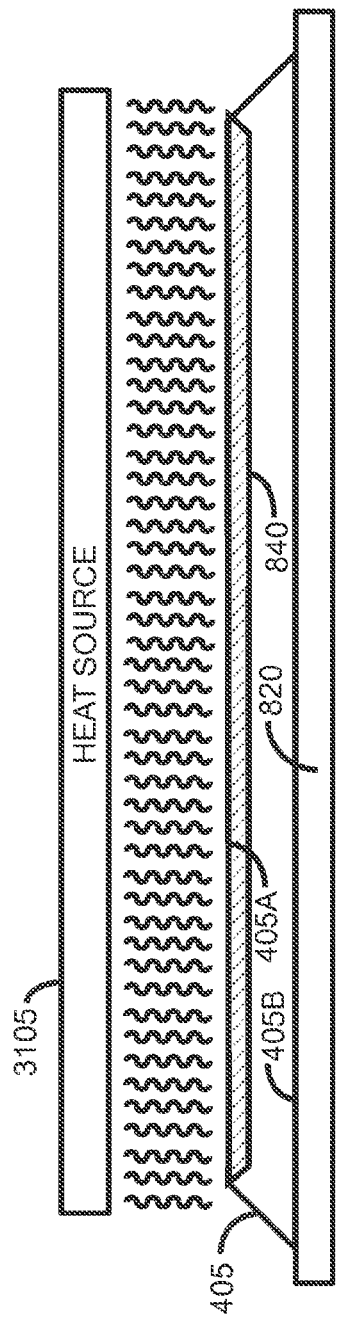
FIG. 31 depicts another embodiment wherein a heat source reliquefies substantially the entire surface of the gel cushioning member substantially at the same time.
Figure 32:
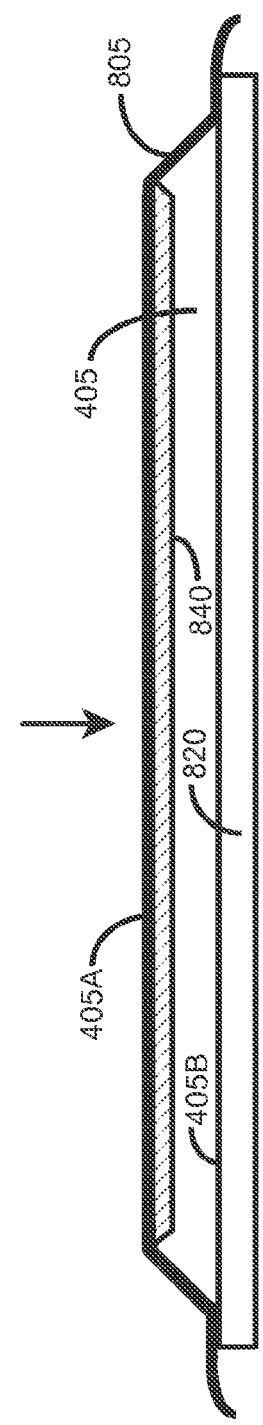
FIG. 32 depicts the embodiment of FIG. 31 after application of a flexible sheet to the reliquefied gel cushioning member surface.

FIG. 31 shows a technique for reliquefying substantially the entire surface 405A of gel cushioning member 405 that may be desirable in some applications. A heat source 3105 is situated in close proximity to gel cushioning member 405 to reliquefy gel surface 405A. A flexible sheet such as flexible support sheet 805 is applied to gel surface 405A as shown in FIG. 32. After application of flexible support sheet 805, cold plate 3205 is moved into contact with support sheet 805 to cool gel cushioning member 405 to complete bonding of support sheet 805 to gel cushioning member 405. The mat assembly thus formed may be inverted and then a flexible base sheet may be applied to a reliquefied surface 405B of gel cushioning member 405.

Figure 33:
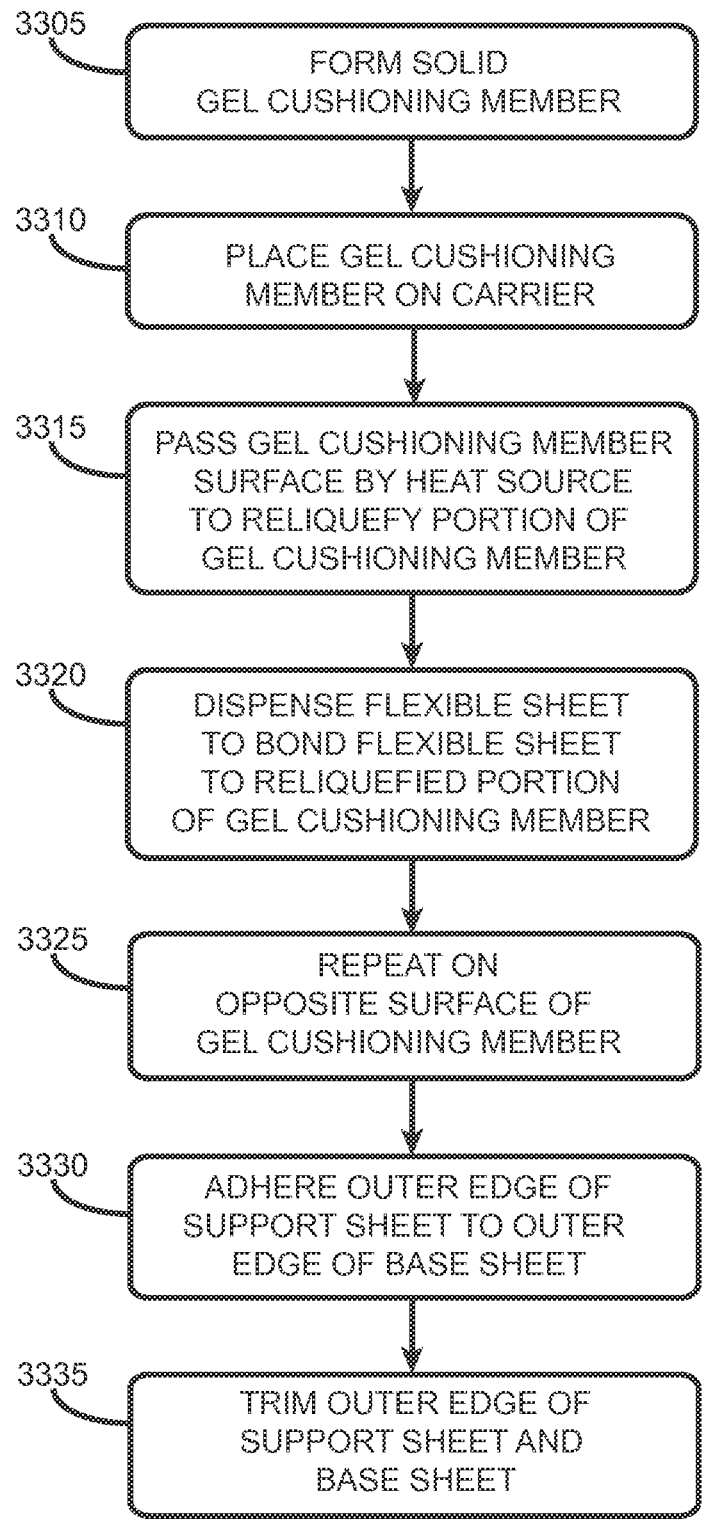
FIG. 33 is a high level flowchart that depicts general process flow in one embodiment of the disclosed anti-fatigue mat methodology.

FIG. 33 is a high level flowchart that depicts process flow in one embodiment of the disclosed mat fabrication methodology. A solid gel cushioning member is formed from heated liquid gel which is cooled, as per block 3305. If desired, this pre-formed or prefabricated solid gel cushioning member may be stored in inventory until actual mat fabrication. Alternatively, the solid gel cushioning member may be used immediately to fabricate a mat. In either case, when mat fabrication is desired, a pre-formed gel cushioning member is placed on a carrier of a conveyor of an assembly line or other device capable of controllable moving the gel cushioning member, as per block 3310. The conveyor moves the gel cushioning member past a heat source that reliquefies a portion of the surface of the gel cushioning member adjacent the heat source, as per block 3315. A sheet dispenser dispenses or rolls a sheet of flexible material onto the reliquefied portion of the gel cushioning member such that, upon cooling, the sheet is bonded to the surface of the gel cushioning member that faced the heat source, as per block 3320. Upon cooling the gel solidifies and forms a bond to the adjacent sheet. The above process steps of reliquefication of a portion of the gel cushioning member and sheet application are repeated to bond another flexible sheet to the opposite surface of the gel cushioning member, as per block 3325. The outer side edge of the support sheet is connected or adhered to the outer side edge of the base sheet by gluing, welding, bonding or other method of connecting these structures, as per block 3330. The outer side edges of the connected support sheet and base sheet are trimmed, as per block 3335 to form the completed anti-fatigue mat.

In one embodiment, the heat source may selectively reliquefy a portion of the gel cushioning member closest to the heat source. In this manner, at a particular point in time the entire surface of the gel cushioning member may not be reliquefied, but rather the portion of the gel cushioning member surface to which the flexible sheet is currently being applied by the dispenser is reliquefied before application of the sheet. The heat source, sheet dispenser and carrier with gel member are configured such that the portion of the gel member surface reaching the sheet dispenser is reliquefied prior to that portion reaching the sheet dispenser. Thus, less than the entire surface of the gel cushioning member may be in the reliquefied state at a particular point in time during sheet bonding. In an alternative embodiment, a larger heat source may spread out across and reliquefy substantially the entire surface of the gel cushioning member. In that case, at step 3320 the process dispenses and bonds a flexible sheet to the gel member surface that is substantially reliquefied before application of the flexible sheet. The process continues with adhering step 3330 and trimming step 3335 to complete the anti-fatigue mat. In one embodiment, the disclosed process may be used to reliquefy a portion of a gel member surface and apply a buffer sheet to that reliquefied portion using the above teachings. The reliquefied portion may grow and expand across the surface of the gel member while the flexible buffer sheet or other flexible sheet is dispensed to the reliquefied portion until application of the flexible sheet is complete.

Figure 34:
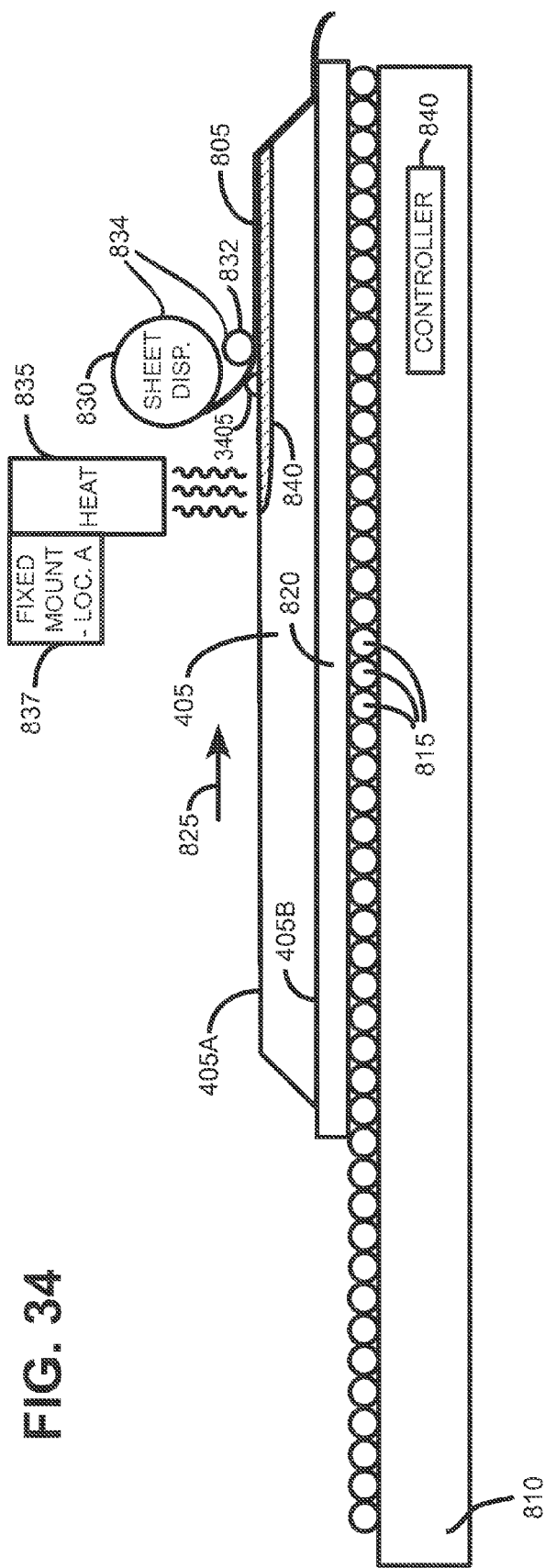
FIG. 34 is a cross section side view of the gel cushioning member and flexible support sheet during sheet bonding that shows a gel wave front build-up as the flexible support sheet is bonded to the reliquefied portion of the gel cushioning member.

FIG. 34 shows one problem that may be encountered when the disclosed methodology is used to apply a flexible sheet to a selectively reliquefied portion of the surface of a gel cushioning member such as gel cushioning member 405. As flexible sheet 805 is dispensed across gel cushioning member 405, it is possible that a wave front or ripple 3405 of excess reliquefied gel may form or build-up adjacent roller 832 when gel cushioning member 405 passes by roller 832 and sheet dispenser 830, as shown in FIG. 34. For drawing purposes, the size of the wave front or gel ripple 3405 is significantly enlarged as compared to its actual size in practice. Sheet dispenser 830 and roller 832 cooperate to apply sheet 805 to the adjacent reliquefied surface of gel cushioning member 405 as member 405 passes by. Sheet dispenser 830 together with pressure roller 832 form applicator 834 that applies the dispensed flexible sheet to the reliquefied portion of gel surface 405A adjacent applicator 834. In so applying flexible sheet 805 to gel member surface 405A, the undesired gel ripple 3405 may be generated. In FIG. 34, the size of gel wave front or ripple 3405 is enlarged for purposes of illustration. In actual practice, gel ripple 3405 may be significantly smaller than shown in FIG. 34.

To consume or reduce this wave front or ripple 3405, a modified gel cushioning member 405' shown in FIG. 35 may be employed. More specifically, the bonding process may employ a gel cushioning member 405' wherein the upper surface 405A' includes a plurality of recesses 3505 or valleys that consume the gel wave front or ripple 3405 as sheet 805 moves across and bonds to gel cushioning member 405'. Upper surface 405A' also includes a plurality of peaks or ridges 3510 between the valleys 3505, as shown in simplified FIG. 36. As sheet 805 bonds to reliquefied portion 840' at applicator 834, the wave front or gel ripple 3405 is pushed into, and substantially consumed by, recesses 3505 as they pass adjacent applicator 834. The recesses 3505 and peaks or ridges 3510 are enlarged for purposes of illustration in FIG. 35. In actual practice, the recesses 3505 and ridges 3510 may be smaller than shown in FIG. 35. Likewise, the vertical height of gel ripple 3405 is substantially enlarged for illustration purposes in FIG. 36. As shown in FIG. 37, the opposite gel member surface 405B' may also include a plurality of recesses 3705 to consume a gel wave front that may appear when bonding base sheet 2110 (not shown) to gel surface 405B' of gel cushioning member 405'. Gel surface 405B also includes peaks 3710 between recesses 3705 as shown to give gel surface 405B an appearance similar to that of gel surface 405A on the opposite side of gel cushioning member 405'. As shown in FIG. 35, recesses 3505 alternate with peaks 3510 across the surface 405A' of gel cushion member 405.

Returning to FIG. 36, as gel cushioning member 405 moves in the direction of arrow 825 past applicator 834, the size of gel ripple 3405 tends to grow in size and dimension, but for the action of recesses 3505. To counter this tendency for the gel ripple become increasingly larger, the size of recesses 3505 increases across gel surface 405A as illustrated. In one embodiment, the size of the recesses 3505 and peaks 3510 increases from peripheral side edge 405C to opposite peripheral side edge 405D of gel member 405 in the direction of flexible sheet 805 application. In another embodiment, the size of recesses 3505 increases across a portion of gel surface 405A but not the entire gel surface, for example, as in a scenario where the gel ripple is not significant at locations where applicator 834 starts applying flexible sheet 805 to gel surface 405A but becomes significant as application progresses across gel cushioning member 405.

A methodology for fabricating a resilient mat from a pre-formed solid, resilient gel cushioning member is thus disclosed in the above description. The fabricated mat is typically comfortable on which to stand or otherwise use to support a part of the body. It should be understood that the steps in the described method need not necessarily be performed in the order described.

Modifications and alternative embodiments of this invention will be apparent to those skilled in the art in view of this description of the invention. Accordingly, this description teaches those skilled in the art the manner of carrying out the invention and is to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method of fabricating an anti-fatigue mat comprising:
   forming a gel cushioning member exhibiting a predetermined geometry including first and second opposed major surfaces, the gel cushioning member further including first and second opposed major edges, wherein the first opposed major surfaces of the gel cushioning member includes a plurality of alternating ridges and recesses extending at least part of the way between the first and second opposed edges;
   moving the gel cushioning member to pass by a heat source to selectivity liquefy a portion of the first major surface of the gel cushioning member adjacent the heat source, thus forming a selectivity liquefied portion that becomes larger as a the gel cushioning member moves past the heat source;
   continuously applying, by a sheet applicator, a first flexible sheet to the selectively liquefied portion of the first major surface of the gel cushioning member as the selectively liquefied portion moves past the heat source such that the first flexible sheet bonds to the gel cushioning member when cooled; and
   consuming, by the plurality of alternating ridges and recesses, gel wave front produced on the first opposed major surface of the gel cushioning member as the first opposed major surface of the gel cushioning member is selectively reliquefied during the moving and continuously applying steps.

2. The method of claim 1, further comprising:

heating, by the heat source, the second major surface of the gel cushioning member to liquefy the second major surface of the gel cushioning member; and applying a second flexible sheet to the liquefied second major surface of the gel cushioning member such that the second flexible sheet adheres to the gel cushioning member when cooled.

3. The method of claim 1, wherein the first flexible sheet includes an integral barrier layer at the first major surface of the gel cushioning member.

4. The method of claim 1, wherein the first flexible sheet is a discrete barrier layer.

5. The method of claim 4, further comprising applying a second flexible sheet to the first flexible sheet, wherein the second flexible sheet is a base sheet such that the discrete barrier layer hinders the migration of liquid from the gel cushioning member to the second flexible sheet.

6. The method of claim 1, wherein the forming a gel cushioning member step comprises forming the gel cushioning member by casting.

7. The method of claim 1, wherein the forming a gel cushioning member step comprises forming the gel cushioning member by injection molding.

8. The method of claim 1, wherein the gel cushioning member is pre-formed before the heating step and stored in an inventory storage along with other gel cushioning members.

9. The method of claim 1, wherein the first flexible sheet comprises gel thus providing a first flexible gel sheet that laminates to the gel cushioning member when the applying a first flexible sheet step applies the first flexible sheet to the liquefied first major surface of the gel cushioning member.

10. The method of claim 1, wherein the alternating ridges and recesses increase in size across the first opposed major surface to consume the gel wave front as the gel wave front increases in size across the first opposed major surface when the first flexible sheet is applied to the gel cushioning member by the sheet applicator during the moving and continuously applying steps.

11. The method of claim 9, further comprising heating, by the heat source, a portion of the first flexible gel sheet to be applied to the liquefied first major surface of the gel cushioning member thus forming a liquefied portion of the first flexible gel sheet; and wherein the continuously applying step further comprises applying the liquefied portion of the first flexible gel sheet to the liquefied first opposed major surface of the gel cushioning member to bond the first flexible gel sheet to the gel cushioning member.

12. A method of fabricating an anti-fatigue mat comprising:

forming a gel cushioning member exhibiting a predetermined geometry including first and second opposed major surfaces, the gel cushioning member further including first and second opposed edges, wherein the first opposed major surface of the gel cushioning member includes a plurality of alternating ridges and recesses extending at least part of the way between the first and second opposed edges;

moving a heat source and sheet applicator across the first opposed major surface of the gel cushioning member to selectively liquefy a portion of the first major surface of the gel cushioning member adjacent the heat source, thus forming a selectively liquefied portion that becomes larger as the heat source and sheet applicator move across the first opposed major surface of the gel cushioning member;

continuously applying, by the sheet applicator, a first flexible sheet to the selectively liquefied portion of the first major surface of the gel cushioning member as the heat source and sheet applicator move across the first opposed major surface of the gel cushioning member such that the first flexible sheet bonds to the gel cushioning member when cooled; and consuming, by the plurality of alternating ridges and recesses, a gel wave front produced on the first opposed major surface of the gel cushioning member as the first opposed major surface of the gel cushioning member is selectively reliquefied during the moving and continuously applying steps.

13. The method of claim 12, further comprising:

heating, by the heat source, the second opposed major surface of the gel cushioning member to liquefy the second opposed major surface of the gel cushioning member; and applying a second flexible sheet to the liquefied second opposed major surface of the gel cushioning member such that the second flexible sheet adheres to the gel cushioning member when cooled.

* * * * *